(12) United States Patent
Jeong et al.

(10) Patent No.: US 12,154,563 B2
(45) Date of Patent: *Nov. 26, 2024

(54) ELECTRONIC APPARATUS AND METHOD FOR CONTROLLING THEREOF

(71) Applicant: SAMSUNG ELECTRONICS CO., LTD., Suwon-si (KR)

(72) Inventors: Jonghoon Jeong, Suwon-si (KR); Hosang Sung, Suwon-si (KR); Doohwa Hong, Seoul (KR); Kyoungbo Min, Suwon-si (KR); Eunmi Oh, Suwon-si (KR); Kihyun Choo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 17/679,446

(22) Filed: Feb. 24, 2022

(65) Prior Publication Data

US 2022/0180872 A1 Jun. 9, 2022

Related U.S. Application Data

(63) Continuation of application No. 16/683,342, filed on Nov. 14, 2019, now Pat. No. 11,289,083.
(Continued)

(30) Foreign Application Priority Data

Feb. 28, 2019 (KR) .................. 10-2019-0024241

(51) Int. Cl.
*G10L 15/22* (2006.01)
*G06F 3/16* (2006.01)
(Continued)

(52) U.S. Cl.
CPC .............. *G10L 15/22* (2013.01); *G06F 3/167* (2013.01); *G10L 13/027* (2013.01); *G10L 13/08* (2013.01);
(Continued)

(58) Field of Classification Search
CPC . G06F 3/00; G06F 3/167; G10L 13/00; G10L 13/08; G10L 13/10; G10L 13/027;
(Continued)

(56) References Cited

U.S. PATENT DOCUMENTS 8,065,150 B2   11/2011   Eide
8,352,270 B2   1/2013    Wang et al.
(Continued)

FOREIGN PATENT DOCUMENTS

CN   102543068 A   7/2012
CN   106098056 A   11/2016
(Continued)

OTHER PUBLICATIONS

Z. Wu, C. Valentini-Botinhao, O. Watts, and S. King, "Deep neural networks employing multi-task learning and stacked bottleneck features for speech synthesis," in Acoustics, Speech and Signal Processing (ICASSP), 2015 IEEE International Conference on. IEEE, 2015, pp. 4460-4464 (Year: 2015).*
(Continued)

*Primary Examiner* — Daniel C Washburn
*Assistant Examiner* — Sean E Serraguard
(74) *Attorney, Agent, or Firm* — Sughrue Mion, PLLC

(57) ABSTRACT

An electronic apparatus, based on a text sentence being input, obtains prosody information of the text sentence, segments the text sentence into a plurality of sentence elements, obtains a speech in which prosody information is reflected to each of the plurality of sentence elements in parallel by inputting the plurality of sentence elements and
(Continued)

the prosody information of the text sentence to a text to speech (TTS) module, and merges the speech for the plurality of sentence elements that are obtained in parallel to output speech for the text sentence.

18 Claims, 18 Drawing Sheets

Related U.S. Application Data

(60) Provisional application No. 62/767,168, filed on Nov. 14, 2018.

(51) Int. Cl.
*G10L 13/027* (2013.01)
*G10L 13/08* (2013.01)
*G10L 15/26* (2006.01)
*G10L 17/06* (2013.01)

(52) U.S. Cl.
CPC .............. *G10L 15/26* (2013.01); *G10L 17/06* (2013.01); *G10L 2015/223* (2013.01)

(58) Field of Classification Search
CPC ......... G10L 15/00; G10L 15/22; G10L 15/26; G10L 2015/223; G10L 17/00; G10L 17/06
See application file for complete search history.

(56) References Cited

U.S. PATENT DOCUMENTS

| | | | | |
|---|---|---|---|---|
| 9,311,912 | B1* | 4/2016 | Swietlinski | G10L 13/00 |
| 9,318,113 | B2 | 4/2016 | Westby et al. | |
| 9,368,104 | B2 | 6/2016 | Eller et al. | |
| 9,508,338 | B1 | 11/2016 | Kaszczuk et al. | |
| 9,646,601 | B1 | 5/2017 | Jedrzejczak et al. | |
| 9,704,476 | B1 | 7/2017 | Swietlinski et al. | |
| 10,394,963 | B2 | 8/2019 | Erickson et al. | |
| 2001/0047260 | A1* | 11/2001 | Walker | G10L 13/00 |
| | | | | 704/260 |
| 2004/0193398 | A1 | 9/2004 | Chu et al. | |
| 2007/0192105 | A1* | 8/2007 | Neeracher | G10L 13/08 |
| | | | | 704/E13.011 |
| 2008/0010070 | A1 | 1/2008 | Kim et al. | |
| 2008/0071529 | A1* | 3/2008 | Silverman | G10L 13/02 |
| | | | | 704/E21.009 |
| 2008/0288257 | A1 | 11/2008 | Eide | |
| 2009/0070115 | A1* | 3/2009 | Tachibana | G10L 13/07 |
| | | | | 704/260 |
| 2010/0312565 | A1 | 12/2010 | Wang et al. | |
| 2013/0289998 | A1* | 10/2013 | Eller | G10L 13/08 |
| | | | | 704/260 |
| 2014/0200894 | A1* | 7/2014 | Osowski | G10L 13/04 |
| | | | | 704/260 |
| 2015/0006171 | A1 | 1/2015 | Westby et al. | |
| 2016/0021334 | A1 | 1/2016 | Rossano et al. | |
| 2017/0116185 | A1 | 4/2017 | Erickson et al. | |
| 2017/0116187 | A1* | 4/2017 | Erickson | G10L 13/027 |
| 2017/0256252 | A1* | 9/2017 | Christian | G06F 40/30 |
| 2018/0082675 | A1* | 3/2018 | Wang | G10L 13/10 |
| 2018/0130462 | A1 | 5/2018 | Kayama et al. | |
| 2019/0164551 | A1* | 5/2019 | Watanabe | G10L 15/22 |

FOREIGN PATENT DOCUMENTS

| | | |
|---|---|---|
| CN | 106504742 A | 3/2017 |
| CN | 106575502 A | 4/2017 |
| CN | 107924394 A | 4/2018 |
| JP | 9-81174 A | 3/1997 |
| JP | 2017-021125 A | 1/2017 |
| KR | 10-0180650 B1 | 4/1999 |
| KR | 10-0474282 B1 | 3/2005 |
| KR | 10-0883649 B1 | 2/2009 |
| KR | 10-1021215 B1 | 3/2011 |
| KR | 10-1382362 A | 4/2014 |
| WO | 2016/048582 A1 | 3/2016 |

OTHER PUBLICATIONS

Written Opinion (PCT/ISA/237) issued Mar. 2, 2020 by the International Searching Authority in International Application No. PCT/KR2019/015050.

International Search Report (PCT/ISA/210), issued Mar. 2, 2020 by International Searching Authority in International Application No. PCT/KR2019/015050.

Communication issued Jul. 8, 2021 by the European patent Office in counterpart European Patent Application No. 19885929.0.

Eva Szekely et al., "Synthesising uncertainty: the interplay of vocal effort and hesitation disfluencies", INTERSPEECH 2017, Aug. 20-24, 2017, Stockholm, Sweden, pp. 804-808, XP055819752. (5 pages total).

Z. Wu et al., "Deep neural networks employing multi-task learning and stacked bottleneck features for speech synthesis", in Acoustics, Speech and Signal Processing (ICASSP), 2015 IEEE International Conference on. IEEE, 2015, pp. 4460-4464. (Year: 2015).

Communication dated Mar. 29, 2023, issued by the Korean Intellectual Property Office in Korean Patent Application No. 10-2019-0024241.

Communication issued on Dec. 29, 2022 by the Indian Patent Office in Indian Patent Application No. 2127018258.

Communication issued on Mar. 9, 2023 by the European Patent Office in European Patent Application No. 19885929.0.

Communication issued on Dec. 1, 2023 by the China National Intellectual Property Administration in Chinese Patent Application No. 201980063157.X.

Communication dated Sep. 12, 2024, issued by Indian Patent Office in Indian Patent Application No. 202127018258.

\* cited by examiner

FIG. 13

You like samsung. ~1310

You like samsung? ~1320

Do you like samsung? ~1330

You like samsung, don't you? ~1340

ELECTRONIC APPARATUS AND METHOD FOR CONTROLLING THEREOF

CROSS-REFERENCE TO RELATED APPLICATIONS

This application is a Continuation Application of U.S. application Ser. No. 16/683,342, filed on Nov. 14, 2019, which is based on and claims priority under 35 U.S.C. § 119(a) to Korean Patent Application No. 10-2019-0024241, filed on Feb. 28, 2019, in the Korean Intellectual Property Office, and U.S. Provisional Patent Application No. 62/767,168, filed on Nov. 14, 2018, in the United States Patent and Trademark Office, the disclosures of which are incorporated by reference herein in their entireties.

BACKGROUND

1. Field

The disclosure relates to an electronic apparatus and a controlling method thereof. More particularly, the disclosure relates to an electronic apparatus capable of implementing a more natural sounding dialogue system and a controlling method thereof.

2. Description of Related Art

In recent years, artificial intelligence (AI) systems have been used in various fields. An AI system is a system in which a machine learns, judges, and iteratively improves analysis and decision making, unlike an existing rule-based smart system. As the use of AI systems increases, for example, an accuracy, a recognition rate and understanding or anticipation of a user's taste may be correspondingly increased. As such, existing rule-based smart systems are gradually being replaced by deep learning-based AI systems.

AI technology is composed of machine learning, for example deep learning, and elementary technologies that utilize machine learning.

Machine learning is an algorithmic technology that is capable of classifying or learning characteristics of input data. Element technology is a technology that simulates functions, such as recognition and judgment of a human brain, using machine learning algorithms, such as deep learning. Machine learning is composed of technical fields such as linguistic understanding, visual understanding, reasoning, prediction, knowledge representation, motion control, or the like.

Various fields implementing AI technology may include the following. Linguistic understanding is a technology for recognizing, applying, and/or processing human language or characters and includes natural language processing, machine translation, dialogue system, question and answer, speech recognition or synthesis, and the like. Visual understanding is a technique for recognizing and processing objects as human vision, including object recognition, object tracking, image search, human recognition, scene understanding, spatial understanding, image enhancement, and the like. Inference prediction is a technique for judging and logically inferring and predicting information, including knowledge-based and probability-based inference, optimization prediction, preference-based planning, recommendation, or the like. Knowledge representation is a technology for automating human experience information into knowledge data, including knowledge building (data generation or classification), knowledge management (data utilization), or the like. Motion control is a technique for controlling the autonomous running of the vehicle and the motion of the robot, including motion control (navigation, collision, driving), operation control (behavior control), or the like.

In recent years, various services using an AI agent (for example, Bixby™, Assistant™, Alexa™, etc.) for providing a response to a speech input have been provided. In particular, the introduction of a neural text-to-speech (TTS) technology has resulted in synthetically modeling the relationship of input text and acoustic features to output a generally natural composite sound.

Particularly, in the case of speech synthesis of a long text, there is a problem in that, as the speech synthesis time increases, the feedback speech output by an artificial intelligence (AI) agent becomes slower, and a user may feel the conversation with the AI agent becomes unnatural.

In the case of synthesizing speech in parallel, by segmenting the feedback text sentence to advance a feedback, there has been a problem in that the each of the speech for the segmented text sentence has an independent prosody, and the inter-speech prosody is not connected. Accordingly, unnatural feedback speech is generally output as a whole.

Accordingly, there is a need for an AI dialogue system technology for advancing a feedback speech output while providing a natural feedback speech.

SUMMARY

Aspects of the disclosure address at least the above-mentioned problems and/or disadvantages and provide at least the advantages described below. Accordingly, an aspect of the disclosure is to provide an electronic apparatus capable of implementing a more natural sounding dialogue system, by performing speech synthesis in parallel of a text sentence that is segmented in reflection of prosody information of an entire text sentence, and a controlling method thereof.

According to an aspect of the disclosure, there is provided an electronic apparatus including a memory configured to store at least one instruction and a processor to execute the at least one instruction, which when executed causes the processor to control to, based on obtaining a text input, obtain prosody information of the text input, segment the text input into a plurality of segments, obtain speech segments in which the prosody information is reflected to each segment of the plurality of segments in parallel by inputting the plurality of segments and the prosody information to a text-to-speech (TTS) module, and obtain a speech for the text input by merging the speech segments.

The processor may obtain a plurality of first segments by segmenting the text input based on a first criterion, and based on a first processing time for converting the plurality of first segments to the speech segments being less than a predetermined time, input the plurality of first segments to the TTS module, based on the first processing time for converting at least one first segment of the plurality of first segments to the speech segments being greater than or equal to the predetermined time, obtain a plurality of second segments by segmenting the at least one first segment based on a second criterion, and based on a second processing time for converting the plurality of second segments to the speech segments being less than the predetermined time, input the plurality of second segments the TTS module.

Based on the first criterion being a punctuation marks criterion, the second criterion is based on a clause, and based on the first criterion being a clause criterion, the second criterion is based on a phrase.

The prosody information may include intonation information, and accent information of the text input based on at least one of a format, a syntactic structure, and a context of the text input.

Each segment of the plurality of segments may include index information that is related to an order in the text input, and the processor may obtain the speech for the text input by merging the speech segments based on the index information.

The TTS module may be a deep neural network text to speech (DNN TTS) module.

The electronic apparatus further includes a speaker, and the processor may control the speaker to output a rejoinder speech and the speech for the text input after the rejoinder speech.

The plurality of rejoinder speech may be stored in the memory, and the processor may identify the rejoinder speech from among the plurality of rejoinder speech based on a processing time to obtain the speech for the text input.

The electronic apparatus may further include a communicator and a speaker, and the processor may obtain first segments of the plurality of segments in which the prosody information is reflected to each of the first segments in parallel by inputting the first segments and the prosody information to the text-to-speech (TTS) module, transmit, to an external device for speech synthesis, a remaining segment among the plurality of segments and the prosody information through the communicator, obtain a remaining speech for the remaining segment from the external device performing the speech synthesis on the remaining segment through the communicator, and output the speech by merging the first segments obtained in parallel and the remaining speech received from the external device through the speaker.

The first segments may correspond to a beginning part of the text input, and the processor may output the speech by outputting the first segments and outputting the remaining speech received from the external device after outputting the first segments through the speaker.

According to an aspect of the disclosure, there is provided a method of controlling an electronic apparatus including, based on a text input, obtaining prosody information of the text input; segmenting the text input into a plurality of segments; obtaining speech segments in which the prosody information is reflected to each segment of the plurality of segments in parallel by inputting the plurality of segments and the prosody information to a text-to-speech (TTS) module; and obtaining a speech for the text input by merging the speech segments.

The segmenting may include obtaining a plurality of first segments by segmenting the text input based on a first criterion, and based on a first processing time for converting the plurality of first segments to the speech segments being less than a predetermined time, inputting the plurality of first segments to the TTS module, based on the first processing time for converting at least one first segment of the plurality of first segments to the speech segments being greater than or equal to the predetermined time, obtaining a plurality of second segments by segmenting the at least one first segment based on a second criterion, and based on a second processing time for converting the plurality of second segments to the speech segments being less than the predetermined time, inputting the plurality of second segments to the TTS module.

Based on the first criterion being a punctuation marks criterion, the second criterion is based on a clause, and based on the first criterion being a clause criterion, the second criterion is based on a phrase.

The prosody information may include intonation information, and accent information of the text input based on at least one of a format, a syntactic structure, and a context of the text input.

Each segment of the plurality of segments may include index information that is related to an order in the text input, and the obtaining the speech for the text sentence may include obtaining the speech for the text input by merging the speech segments based on the index information.

The controlling method may further include outputting a rejoinder speech and the speech for the text input after the rejoinder speech through a speaker.

The rejoinder speech may include a plurality of rejoinder speech, and the outputting may include identifying the rejoinder speech based on a processing time to obtain the speech for the text input.

The controlling method may further include obtaining first segments of the plurality of segments in which the prosody information is reflected to each of the first segments in parallel by inputting the first segments and the prosody information to the text-to-speech (TTS) module, transmitting, to an external device for speech synthesis, a remaining segment among the plurality of segments and the prosody information, obtaining a remaining speech for the remaining segment from the external device performing the speech synthesis on the remaining segment, and outputting the speech by merging the first segments obtained in parallel and the remaining speech received from the external device through a speaker.

The first segments correspond to a beginning part of the text input, and the outputting the speech by outputting the first segments and outputting the remaining speech received from the external device after outputting the first segments through the speaker.

According to an aspect of the disclosure, there is provided a computer readable medium including a program to execute a method of controlling an electronic apparatus, the method including, based on a text input, obtaining prosody information of the text input; segmenting the text input into a plurality of segments; obtaining speech segments in which the prosody information is reflected to each segment of the plurality of segments in parallel by inputting the plurality of segments and the prosody information to a text-to-speech (TTS) module; and obtaining a speech for the text input by merging the speech segments.

BRIEF DESCRIPTION OF THE DRAWINGS

The above and other aspects, features, and advantages of embodiments of the disclosure will be more apparent from the following description taken in conjunction with the accompanying drawings, in which:

FIG. 13 and FIG. 14 are views to describe a difference of prosody information according to a text sentence;

DETAILED DESCRIPTION

Figure 1:
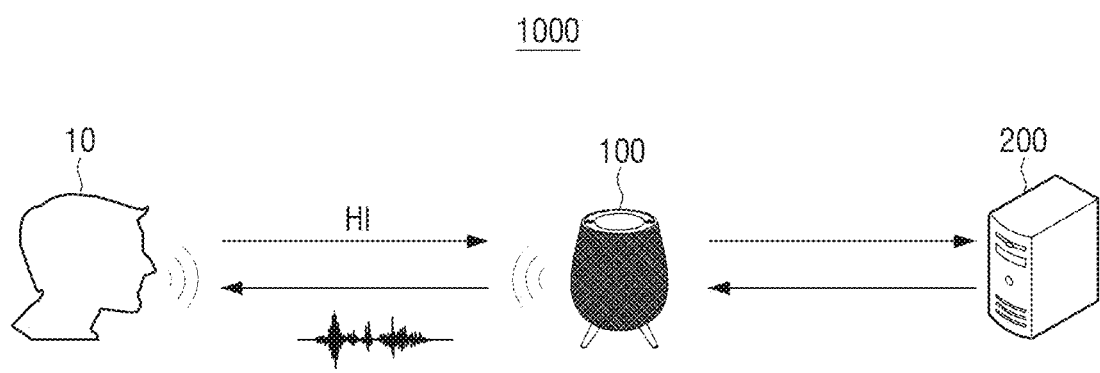
FIG. 1 is a diagram of an artificial intelligence (AI) dialogue system according to an embodiment.

Embodiments of the disclosure will be described in detail.

Terms that are generally and widely used were selected as terms used in embodiments of the disclosure in consideration of functions in the disclosure, but the meaning of such terms may be understood depending on the intention of those skilled in the art, the emergence of a new technique, and the like. In addition, in a specific case, arbitrary terms may be selected. In this case, the meaning of such arbitrary terms will be described in detail in a corresponding description portion of the disclosure. Therefore, the terms used in embodiments of the disclosure should be defined on the basis of the meaning of the terms and the contents throughout the disclosure rather than simple names of the terms.

Because the disclosure may be variously modified and have several embodiments, specific embodiments of the disclosure will be illustrated in the drawings and be described in detail in the detailed description. However, it is to be understood that the disclosure is not limited to specific embodiments, but the scope of the disclosure includes all modifications, equivalents, and substitutions without departing from the scope and spirit of the disclosure. When a detailed description of conventional techniques related to the disclosure may obscure the understanding of the disclosure, the detailed description of such conventional techniques will be omitted.

The terms 'first', 'second', and the like, may be used to describe various components, but the components are not to be construed as being limited by the terms. The terms are used only to distinguish one component from another component.

Singular expressions are intended to include plural forms unless the context clearly indicates otherwise. It will be further understood that terms "include" or "formed of" used in the specification specify the presence of features, numerals, steps, operations, components, parts, or combinations thereof mentioned in the specification, but do not preclude the presence or addition of one or more other features, numerals, steps, operations, components, parts, or combinations thereof.

The terms such as "module," "unit," "part," and so on refer to an element that performs at least one function or operation, and such element may be implemented as hardware or software, or a combination of hardware and software. Further, except for when each of a plurality of "modules," "units," "parts," and the like needs to be realized in an individual hardware, the components may be integrated in at least one module or chip and be realized in at least one processor.

Hereinafter, embodiments of the disclosure will be described in detail with reference to the accompanying drawings so that those skilled in the art to which the disclosure pertains may easily practice the disclosure. However, the present disclosure may be implemented in various different forms, and the disclosure is not limited to only the embodiments described herein. In addition, in the drawings, portions unrelated to the description will be omitted to avoid obscuring the disclosure, and similar portions will be denoted by similar reference numerals throughout the specification.

The embodiments will be further described with reference to the drawings.

FIG. 1 is a diagram of an artificial intelligence (AI) dialogue system according to an embodiment.

Referring to FIG. 1, an artificial intelligence (AI) dialogue system 1000 may include an electronic apparatus 100 that receives a user command in the form of a speech signal from a user 10 and provides the user 10 with a response in the form of an audible audio signal. The electronic apparatus 100 may detect a user query from the speech of the user, as shown in FIG. 1, but this is merely an embodiment, and the electronic apparatus 100 may receive a user query through one or more of various input methods, such as speech, touch input, keyboard input, or the like.

The electronic apparatus 100 may provide the user with a speech-type response. The speech-type response may be based on a pre-stored text, such as an e-book, or may be based on a text generated to correspond to an intent of the user through speech recognition of the user query. According to an embodiment, the artificial intelligence dialogue system 100 may also include a server 200 for exchanging data with the electronic apparatus 100 and performing data processing. For example, the server 200 may receive data from the electronic apparatus 100 to perform speech synthesis of the voice of the user, and transmit the synthesized speech to the electronic apparatus 100 so that the electronic apparatus 100 may output the synthesized speech. Here, the server 200 performing the data processing may be one or more servers.

With respect to FIG. 1, some data processing operations are performed by the server 200 and other data processing operations may be performed by the electronic apparatus 100. However, the data processing operation of the dialogue system 1000 may be performed locally by the electronic apparatus 100.

In FIG. 1, the electronic apparatus 100 is illustrated as implemented by an AI speaker, but the electronic apparatus 100 is not limited thereto and may be implemented as a smartphone, a desktop PC, a laptop PC, a netbook computer, a server, a personal digital assistant (PDA), personal media player (PMP), a medical device, a camera, a TV, a refrigerator, an air-conditioner, a cleaner, an oven, a washing machine, an air purifier, a set-top box, a home automation control panel, a security control panel, a media box (example: Samsung HomeSync™, Apple TV™, or Google TV™), game console (example: Xbox™, PlayStation™), kiosk, a wearable device (e.g., as a watch, a ring, a bracelet, a bracelet, a necklace, a pair of glasses, a contact lens or a head-mounted-device (HMD), clothes, skin pad), or the like. In some embodiments, the electronic apparatus 100 may be a server that is connected to a terminal device, such as a computer, smartphone, or other electronic apparatus.

The electronic apparatus 100 may receive a speech of the user including a trigger word for activating or waking up the AI agent program before receiving a user query. For example, the electronic apparatus 100 may receive speech including a trigger word such as "Hi, Bixby" before receiving a user query. When the speech including the trigger word is input, the electronic apparatus 100 may execute or activate the AI agent program to detect and receive input of the user query. The AI agent program may include a dialogue system that may process a user query and output an appropriate response to the user query in a natural language.

In an embodiment, the electronic apparatus 100 may receive speech of "hello" from the user 10. In this case, the electronic apparatus 100 may analyze the intention of the speech and obtain information on the response speech included as the response text corresponding to the input speech. The electronic apparatus 100 may further utilize information obtained through an embedded sensor and a camera and obtain a response to the input speech.

The electronic apparatus 100 may input information about a response speech to a text to speech (TTS) module to obtain a response speech signal, and output the obtained response speech signal through a speaker. In this case, if a response speech is not output even after exceeding a preset time from a time when the user provided the input speech, the user 10 may feel that the dialogue with the electronic apparatus 100 is unnatural owing to a delay in the electronic apparatus 100 providing a response to the user.

According to the disclosure, the electronic apparatus 100 may output the response speech within a time limit and implement a natural dialog system that has no unnaturalness in the output speech, by segmenting a text sentence for a response speech signal into a plurality of sentence elements, and reflecting the prosody information of the entire text sentence to perform speech synthesis for each sentence element. Specific speech synthesis operations are described in detail below with reference to FIGS. 2 to 18.

Figure 2:
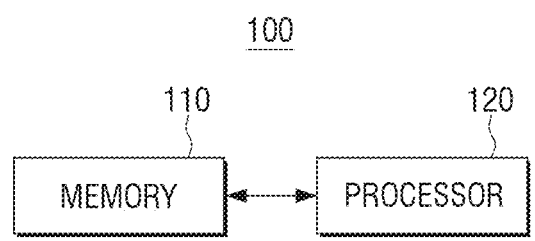
FIG. 2 is a block diagram illustrating an electronic apparatus according to an embodiment.

FIG. 2 is a block diagram illustrating an electronic apparatus according to an embodiment.

Referring to FIG. 2, the electronic apparatus 100 includes a memory 110 and a processor 120.

The memory 110 may store various programs and data that provide for control of operations of the electronic apparatus 100. The memory 110 may store computer-executable software programs of computer-readable instructions. The processor 120 may control the electronic apparatus 100 to perform operations by executing the instructions of the software programs stored in the memory 110. The memory 110 may be implemented as a non-volatile memory, a volatile memory, a flash memory, a hard disk drive (HDD), a solid state drive (SSD), or the like. The memory 110 is accessed by the processor 120 and reading/writing/modifying/deleting/updating of data by the processor 120 may be performed. In the disclosure, the term memory may include the memory 110, read-only memory (ROM) in the processor 120, RAM, or a memory card (for example, a micro SD card, and a memory stick) mounted to the electronic apparatus 100. In addition, the memory 110 may store programs and data for controlling various screens to be displayed in the display area of the display of the electronic apparatus 100.

The memory 110 may store the AI agent for implementation with the dialogue system. The electronic apparatus 100 may utilize the AI agent to generate a natural language response to the input user utterance. The AI agent may be a dedicated program for providing an AI-based service (for example, a speech recognition service, secretarial service, translation service, search service, or the like). The AI agent may be executed by the processor 120 as a general use processor (for example, central processing unit (CPU)) or a separate AI-specific processor (for example, graphics processing unit (GPU), or the like).

The processor 120 may be electrically connected to the memory 110 and control operations of the electronic apparatus 100. The processor 120 may control the electronic apparatus 100 by executing at least one instruction of software stored in the memory 110.

According to an embodiment, the processor 120 may be implemented as a digital signal processor (DSP), a microprocessor, and a time controller (TCON) for processing a digital image signal, but the processor 120 is not limited thereto. The processor 120 may include one or more among a central processing unit (CPU), a micro controller unit (MCU), a micro processing unit (MPU), a controller, an application processor (AP), a communication processor (CP), and an Advanced Reduced instruction set computing (RISC) Machine (ARM) processor or may be defined as a corresponding term. The processor 120 may be implemented in a system on chip (SoC) type or a large scale integration (LSI) type which a processing algorithm is implemented therein or in a field programmable gate array (FPGA).

The processor 120 of the electronic apparatus 100 may control to synthesize a text sentence into a speech signal and output an audio signal corresponding to the speech signal. Here, the text sentence refers to text information of a sentence to be output as speech. The text sentence may be a text sentence stored in the memory 110, such as an e-book, may be received from an external device, or may be obtained as a response corresponding to the received input speech.

When a text sentence corresponding to input speech is generated, the electronic apparatus 100 may receive the input speech from the external device through a communicator 130 (FIG. 3), or directly receive the input speech via a microphone. In the following description, modules used in the dialogue system are classified by functions and described as a plurality of modules. Here, several modules may be implemented as one module, and such modules may be implemented in software or in one or more chip forms.

To be specific, the processor 120 may recognize input speech using an automatic speech recognition (ASR) module, which is one speech recognition module.

The ASR module may convert the input speech (in particular, a user query) into text data. For example, the ASR module may include a speech recognition module. The speech recognition module may include an acoustic model and a language model. For example, the acoustic model may include information related to vocalization, and the language model may include information on unit phoneme information and a combination of unit phoneme information. The speech recognition module may convert the input speech into text data using the information related to vocalization and information on the unit phoneme information. Information about the acoustic model and language model may be stored in, for example, an automatic speech recognition database (ASR DB).

The processor 120 may obtain information on the response speech to respond to a query detected in the input speech by analyzing the intention of the query from converted text of the input speech. The processor 120 may analyze the intention of the text using a natural language processing (NLP) module and obtain response information corresponding thereto. The NLP module may include a natural language understanding (NLU) module, a dialogue manager (DM) module, a natural language generator (NLG) module, or the like.

The natural language understanding module may recognize the intention of a user by performing syntactic analysis or semantic analysis. The syntactic analysis may segment the user input in grammatical units (for example: words, phrases, morphemes, or the like), and determine grammatical elements for each segmented unit of the segmented units. The semantic analysis may be performed using semantic matching, rule matching, formula matching, or the like. Accordingly, the natural language understanding module may acquire domain, intent, or parameter (or slot) to express the intent.

The natural language understanding module may determine user intention and parameters using the matching rule divided into a domain, an intention, and a parameter (or a slot) for grasping the intention. For example, the one domain (for example: an alarm) may include a plurality of intents (for example: alarm setting, alarm cancellation, or the like), and one intention may include a plurality of parameters (for example: time, repetition times, alarm sound, or the like). The plurality of rules may include, for example, one or more mandatory element parameters. The matching rule may be stored in a natural language understanding database (NLU DB).

The natural language understanding module may grasp the meaning of a word extracted from a user input using a linguistic characteristic (for example: a syntactic element) such as a morpheme or a phrase, and determine a user intention by matching the grasped meaning with the domain and the intention. For example, the natural language understanding module may determine the user's intention by calculating how many words extracted from user input are included in each domain and intention. According to an embodiment, the natural language understanding module may determine the parameters of the user input using words that become a basis for understanding the intent. According to an embodiment, the natural language understanding module may determine the user's intention using the natural language recognition database in which the linguistic characteristic for grasping the intention of the user input is stored.

A dialogue manager module may determine whether the intention of a user grasped by the natural language understanding module is clear. For example, the dialogue manager module may determine whether the intention of the user is clear based on whether the parameter information is sufficient. The dialogue manager module may determine whether the parameter grasped in the natural language understanding module is sufficient to perform a task. According to one embodiment, the dialogue manager module may provide feedback to request information to the user if the user intension is unclear. For example, the dialogue manager module may provide the feedback to request information about parameters for understanding the user intention. In addition, the dialogue manager module may generate and output a message for checking a user query including the text changed by the natural language understanding module.

According to one embodiment, the dialogue manager module may include a content provider module. The content prover module may generate a result of performing a task corresponding to the user input when an operation is performed based on the intent and the parameter recognized in the natural language understanding module.

According to another embodiment, the dialogue manager module may provide a response to the user query using a knowledge base. At this time, the knowledge base may be included in the electronic apparatus 100, but this is an example and may be included in an external server. Specifically, the dialog manager module may obtain information about a response speech that is responsive to the user's speech based on an intent of the analyzed user's speech. Here, the information about the response speech may include text information of the response content and emotional information corresponding to the response content. Here, the emotional information may include voice tone information, style information, prosody information, or the like.

The natural language generation module (NLG module) may change the designated information into a text form. The information changed in the text form may be a form of natural language utterance. The designated information may be, for example, information about an additional input, information for guiding completion of an action corresponding to a user input, or information for requesting an additional input of a user (for example: feedback information for a user input). The information changed in the text form may be converted into a speech form by the TTS module.

The TTS module may convert the information of the text format included in the information on the response speech into the response audio signal that is the information in the speech format. The TTS module may receive information of a text format from the natural language generation module, change the information of the text format into information of a speech format, and output the same. The TTS module may be the TTS module that operates based on a deep neural network (DNN). The speech synthesis operation of the DNN-based TTS module will be further described in FIG. 6.

When a text sentence is input, the processor 120 may obtain prosody information of the text sentence. To be specific, the processor 120 may obtain the prosody information of the entire text sentence by analyzing the sentence structure of the text sentence. The prosody information may include phoneme information, intonation information, accent information, or the like, of the entire text sentence.

The prosody information may include intonation or accent information, in addition to the phoneme information indicating the speech contents in the speech, and the magnitude (energy) of sound, height of sound (frequency), length of sound (duration time), or the like, may be controlled by the prosody information.

Here, the phoneme information refers to the smallest unit of sound that distinguishes the meaning of a word, and may be, for example, a vowel and a consonant. In this case, the processor 120 may use pronunciation rule information for reflecting a general phonetic phenomenon, such as consonantal entent and palatalization, or the like.

The intonation information may include a melody curve of the sound and/or height change information of the sound. In addition, the intonation information may be classified into syllable intonation, word intonation, sentence intonation, or the like, according to the type of sentence element in which the intonation is defined. In this case, the intonation information may be used to deliver additional information in addition to the simple contents of the pronunciation.

The meaning of the speech may be distinguished based on the information of intonation which refers to height of sound. For example, speech meaning can be distinguished as an interrogative sentence when pitch of voice near the end of the sentence increases, a declarative sentence when pitch of voice near the end of the sentence decreases, an imperative sentence when pitch of voice near the end of the sentence is substantially constant, or there is a different vocabulary after the sentence.

The accent information is information on a part that is strongly pronounced in a sequence of speeches, and the accent may be divided into a sentence accent in a sentence, a word accent in a word, and a syllables accent in syllables, or the like, according to a type of the sentence elements. Even the same sentence may have different accents depending on the language of each country.

The accent information includes an accent generated by a physiological factor and a psychological factor.

For example, that the accent comes to the long vowel syllable, the accent comes to the syllable which has the nasal as a final sound and a syllable which has fortis and aspiration as an initial sound is due to a physiological reason.

The psychological accent is intended for the effect of emotional expression, such as the case in which the accent comes to a key concept word, when a word newly appears in a sentence, or when the accent comes in words that are opposed to the words written in the front and back sentences, or the like. In addition to this, in terms of grammar, commands, prohibitions, or the like, are often expressed as a hard accent, and questions and speculations, or the like, may be expressed as a soft accent.

In the meantime, the prosody information, which includes various information about sound as described above, may be obtained based on at least one of a form of a text sentence, a syntactic structure, and a context.

Here, the form of the text sentence may be distinguished according to the intention of the sentence, and the form of the text sentence may be distinguished by the contents of the sentence, punctuation marks or the like. For example, the text sentence may have at least one of various forms such as a declarative sentence, an interrogative sentence, an imperative sentence, a pleading sentence, an exclamatory sentence, an affirmative sentence, a negative sentence, or the like. In this case, the punctuation marks may be periods, commas, exclamation marks, question marks, or the like.

The syntactic structure may be a structure or function of phrases, clauses, or sentences formed by combining words, and may be used to determine the order of words. At this time, the syntactic frame includes a slot or a placeholder in which words are sequentially entered one by one. For example, one text sentence has a plurality of slots, and each word may be placed in the slot according to syntactic rules of the corresponding language. In other words, the syntactic structure may mean an arrangement structure of words according to grammar.

The context may be a language context or environment associated with a portion in which a given language expression appears. Language expressions often have ambiguity and it may not be understood what the language expression implies, if not considering the context. The language's internal context, such as the contents or the language's external context, that is, speech situation may have a critical role to resolve ambiguity. In one embodiment, the contextual information may be in the form of metadata that is delivered to the TTS in addition to linguistic information, such as a global style token (GST).

The processor 120 may obtain emotional information corresponding to the text sentence based on the intention and contextual information, or the like, of the text sentence.

As described above, the processor 120 may obtain prosody information including phonetic information, intonation information, and accent information of the speech to be spoken, based on the type of text sentence, the syntactic structure, and the contextual information. The processor 120 may further use the emotional information corresponding to the text sentence to obtain the prosody information.

When the speech is synthesized according to the prosody information, even the same texts may have different prosody. This will be described in greater detail with reference to FIGS. 13 to 15.

The processor 120 may segment the text sentence into a plurality of sentence elements. The sentence element herein may be the segmented sentence obtained by segmenting the sentence based on a preset criterion, such as words, syllables, and phonemes.

The processor 120 may input a plurality of segmented sentence elements into the TTS module and obtain a speech for each of the plurality of sentence elements in parallel. Here, obtaining the speech in parallel may mean that at least a portion of a speech synthesis operation for a plurality of sentence elements is simultaneously performed.

The processor 120 may further input the obtained prosody information to the TTS module and obtain the speech in which the prosody information is reflected to each of the plurality of sentence elements.

Specifically, the processor 120 may determine the length of the sentence element based on the processing time that is required to perform speech synthesis for a plurality of sentence elements that are segmented from the text sentence in parallel. For example, if a predetermined time or more time is required for synthesizing the plurality of sentence elements that are segmented from the text sentence into a speech in parallel, the processor 120 may re-segment the segmented sentence elements.

For example, the processor 120 may segment the text sentence based on first criterion and obtain the plurality of sentence elements, and when the time that is required to convert the plurality of obtained sentence elements into speech is less than a preset time, the processor 120 may input the plurality of first sentence elements to the TTS module.

When the time that is required for at least one of the plurality of sentence elements to be converted to speech is greater than or equal to a preset time, a plurality of sentence elements having a shorter length may be obtained by segmenting at least one sentence element which requires a preset time or more to convert the sentence element to speech based on the second criterion.

If the time required to convert the plurality of sentence elements that are obtained by segmenting based on the second criterion into speech is less than a predetermined time, the processor 120 may input, to the TTS module, remaining sentence elements to which the second criterion is not applied from among the plurality of sentence elements obtained based on the first criterion and the plurality of sentence elements obtained by applying the second criterion. In this case, the sentence element input to the TTS module may have the time required to synthesize speech that is less than a predetermined time.

If the time required for at least one of the plurality of sentence elements obtained based on the second criterion is greater than or equal to a predetermined time for synthesizing the speech, the processor 120 may obtain a plurality of sentence elements having a shorter length by segmenting the at least one sentence element of which time required for synthesizing into speech is greater than or equal to a predetermined time, based on the third criterion.

For example, if the first criterion is a punctuation marks criterion, the second criterion may be a clause criterion and the third criterion may be a phrase criterion. Meanwhile, according to an embodiment, if the first criterion is a clause criterion, the second criterion may be a phrase criterion.

Meanwhile, the criterion applied to segmenting the sentence element is not limited thereto, and if the time taken to synthesize the sentence element acquired to speech by the phrase criterion is greater than or equal to a predetermined time, the criterion may be further segmented based on various criteria such as words, spacing, or the like.

The processor 120 may include index information in each of the plurality of sentence elements. Here, the index information may be indicative of an order of the sentence elements within the text sentence. Specifically, the index information may be included in the data for the sentence element in the metadata form. Meanwhile, the operation of segmenting the text sentence will be described in detail with reference to FIGS. 12 to 14.

In addition, the processor 120 may merge speech for a plurality of sentence elements obtained in parallel, and obtain the speech for the text sentence. Specifically, the processor 120 may merge a plurality of sentence elements based on index information included in each of the plurality of sentence elements and obtain speech for the entire text sentence.

As described above, it is possible to reduce the time required for speech synthesis by segmenting the text sentence and performing speech synthesis in parallel. In addition, by synthesizing the speech by reflecting the prosody information of the entire text sentence in the parallel speech synthesis process, the styles of the speech become similar to each other when combining and providing the speech of the segmented sentences, thereby reducing the unnaturalness of the prosody between speeches. This allows implementation of a natural AI dialog system that enables providing a quick response and output a speech to a user query without unnaturalness.

Figure 3:
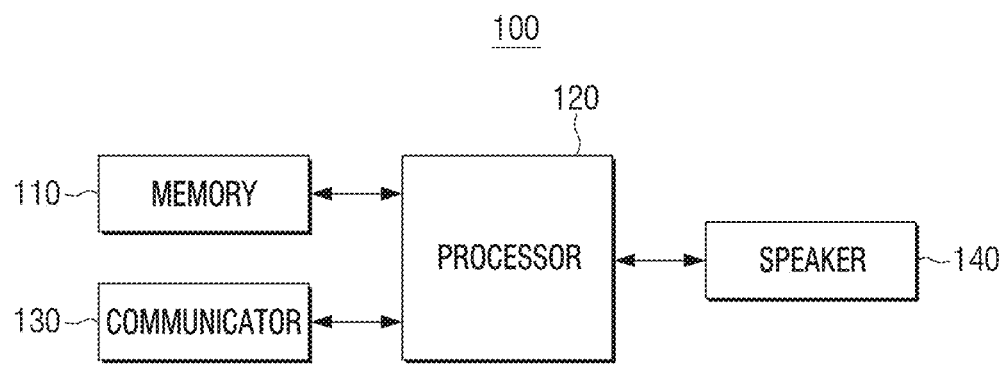
FIG. 3 is a detailed block diagram of an electronic apparatus of FIG. 2.

FIG. 3 is a detailed block diagram of an electronic apparatus of FIG. 2.

Referring to FIG. 3, the electronic apparatus 100 may include the memory 110, the processor 120, a communicator 130, and a speaker 140.

Some configurations of the memory 110 and the processor 120 are the same as the configurations of FIG. 2 and redundant descriptions thereof will be omitted.

The memory 110 may store a rejoinder speech. In this case, the rejoinder speech is a speech that is output before the synthesized speech is output through the speaker 140, and is intended to prevent the user from feeling unnaturalness of the dialogue while the speech output is delayed for the processing time required for speech synthesis. For example, the rejoinder speech having various lengths and various nuances, such as "Um~," "Uh~," "Um . . . what I mean is," or the like, may be stored in the memory 110.

The rejoinder speech stored in the memory 110 may be a recorded speech, may be a synthesized speech generated by the TTS module, or the speech may be the case in which the speech signal which is previously reproduced by a caching method, or the like, is reused.

The processor 120 may identify and output rejoinder speech in consideration of the processing time required for speech synthesis. For example, when the processing time required for speech synthesis increases, the processor 120 may output a long length rejoinder speech among the various rejoinder speech stored in the memory 110. In this case, the processor 120 may select the rejoinder speech by further considering the intention of the text sentence.

As another embodiment, the processor 120 may select the rejoinder speech based on the types (for example, Korean, English, or the like) of languages of the text sentence.

In another embodiment, the processor 120 may select the rejoinder speech based on the feature information corresponding to the text sentence. In this case, the feature information corresponding to the text sentence may include emotional information, information on the speaker (for example, gender, a specific person, or the like). That is, even the rejoinder speech of the same length may select different rejoinder speech based on the emotional information and the information about the speaker. The processor 120 may output the speech in which the text sentence is synthesized, after completing output of the identified rejoinder speech.

In the above description, it has been described that the rejoinder speech is stored in the memory 110, but in actual implementation, only rejoinder text is stored in the memory 110, the rejoinder text is selected according to the text sentence to be speech synthesized by the processor 120, and the rejoinder speech may be synthesized with the selected rejoinder text and output through the speaker 140.

The communicator 130 is a communication interface configured to perform communication with various types of external devices according to various types of communication methods. Here, the external device communicating with the electronic apparatus 100 may be a server, a user terminal device, or the like.

Communication through the communicator 130 with an external device may include communication via a third device (for example, a repeater, a hub, an access point, a server, a gateway, or the like). The communicator 130 may be a wireless communication interface for wireless communication including cellular communication using any one or any combination of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM) and the like. According to embodiments, the wireless communication may include, for example, any one or any combination of wireless fidelity (Wi-Fi), Bluetooth, Bluetooth low energy (BLE), Zigbee, near field communication (NFC), magnetic secure transmission, radio frequency (RF), or body area network (BAN). The communicator 130 may be a wired communication interface, for example an Ethernet network interface controller (NIC), for performing wired communication including any one or any combination of, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network.

The processor 120 may transmit via the communicator 130, to the external device, speech information obtained with respect to the text sentence and enable the external device to output the same through a speaker provided in the external device.

The processor 120 may transmit the remaining sentence elements, except the sentence elements of some of the plurality of sentence elements obtained by segmenting the text sentence to the external device through the communicator 130. Here, the external device may be an external server, an external terminal device, or the like for speech synthesis. In this case, the processor 120 may transmit prosody information of the text sentence together with the sentence element so that the prosody information is reflected by the external server and speech synthesis is performed.

The processor 120 may obtain the speech for some sentence elements in parallel by reflecting the prosody information to some sentence elements among the plurality of sentence elements.

In addition, the processor 120 may obtain speech for the sentence element transmitted from the external device. In addition, the processor 120 may output the received speech and the obtained speech in parallel through the speaker 140. In this case, the processor 120 may merge the received speech and acquired speech in parallel based on the index information, and output the merged speech through the speaker 140.

Meanwhile, the processor 120 may segment the text sentence into a plurality of sentence elements such that the processing time required to synthesize the plurality of sentence elements in parallel is less than a predetermined time, and then transmit some of the plurality of segmented sentence elements to the external device, but the remaining parts of the text sentence for speech synthesis by the electronic apparatus 100 may not be segmented and transmitted to the external device. In this case, the external device may obtain a plurality of sentence elements by dividing the remaining part of the received text sentence.

A portion of the text sentence that is synthesized by the electronic apparatus 100 may be a beginning part of the text sentence. In this case, the processor 120 may output the obtained speech with respect to some sentence elements through the speaker 140, and then output the speech received from the external device through the speaker 140. At this time, the speech synthesized at the external device may be received before or during output of the speech obtained by the processor 120.

Even when the latter part of the text sentence is speech-synthesized at the external device, the processor 120 may output the rejoinder speech while speech-synthesizing a part of the plurality of sentence elements. In this case, the output rejoinder speech may be pre-stored in the memory 110, synthesized by the TTS module, or received from an external device.

When the rejoinder speech is received from the external device, the external device may select the rejoinder speech based on information (language, speaker, emotion, etc.) regarding the text sentence shared with the electronic apparatus 100. In addition, the external device may select the rejoinder speech having a specific speech length based on the estimated synthesis time.

In this case, the external device and the electronic apparatus 100 may share information using a JavaScript object notation (JSON) format, and the shared information may be obtained from the electronic apparatus 100 that receives the input speech, or obtained from the external device that receives the speech signal from the electronic apparatus 100. As described above, the embodiment in which a part of the text sentence is speech-synthesized in the external device will be further described with reference to FIG. 17.

The speaker 140 is hardware configured to output various notification sounds or speech messages as well as various audio data in which various processing operations such as decoding, amplification, and noise filtering are performed by an audio processor. In particular, the speaker 140 may output a response audio signal to the user query. Specifically, the speaker 140 may output the response to the user query as a speech message in a natural language format. The configuration to output audio may be implemented as a speaker, but this is an example and the speaker 140 may be implemented as an output terminal for outputting audio data.

It has been described that the synthesized speech is output through the speaker 140 provided in the electronic apparatus 100, but in actual implementation, the synthesized audio signal may be transmitted to the external device through the communicator 130, and the synthesized speech may be output by the external device through the speaker.

According to the embodiments, the electronic apparatus 100 may further include various external input ports for connection with an external terminal, a camera, a display, a microphone, various sensors, or the like.

Figure 4:
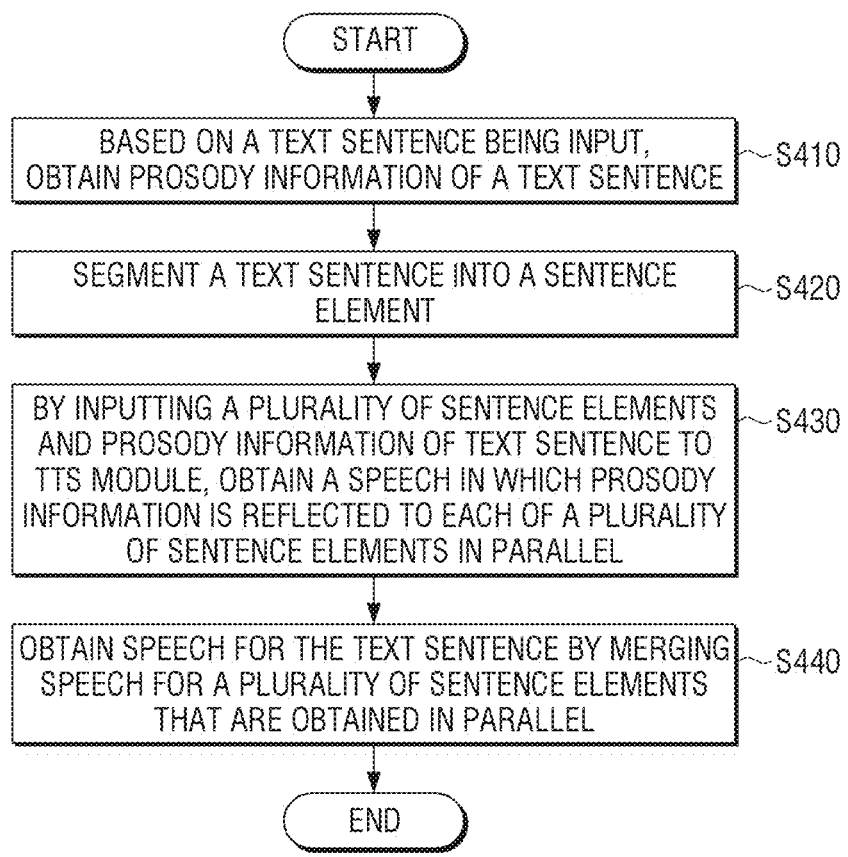
FIG. 4 is a flowchart of a method of controlling of an electronic apparatus according to an embodiment.
Figure 5:
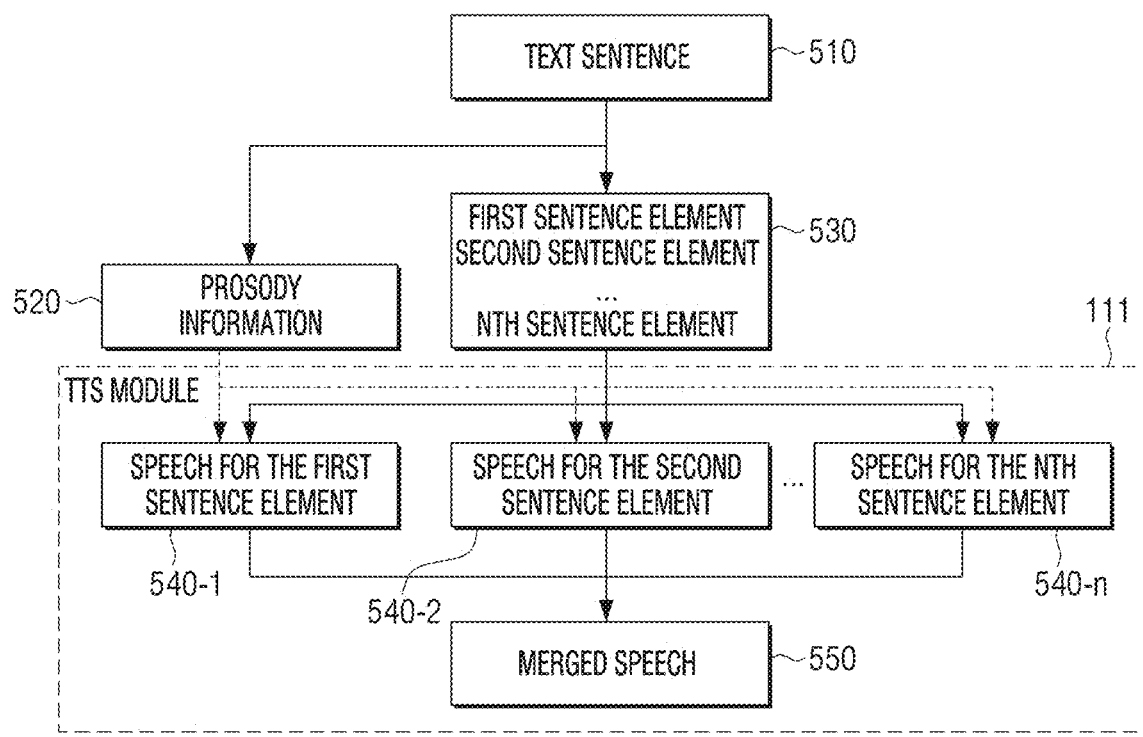
FIG. 5 is a flowchart of a method of controlling an electronic apparatus according to an embodiment.

FIGS. 4 and 5 are flowcharts of methods of controlling an electronic apparatus according to an embodiment.

Referring to FIG. 4, when a text sentence is input, the electronic apparatus may acquire prosody information of the text sentence in operation S410. In this case, the prosody information includes the phoneme information, intonation information, and accent information of the entire text sentence, and may be based on at least one of a sentence form, a syntactic structure, and a context.

Specifically, as illustrated in FIG. 5, when input of a text sentence 510 that is text information of the sentence to be output as speech is obtained, the electronic apparatus may obtain prosody information 520 of the entire text sentence 510.

The electronic apparatus may segment the text sentence into a plurality of sentence elements in operation S420. To be specific, as illustrated in FIG. 5, the electronic apparatus may segment the text sentence 510 to the n number of sentence elements 530.

In this case, the electronic apparatus may segment the text sentence so that the processing time required for the sentence elements to be merged into the speech is less than the predetermined time. To be specific, the electronic apparatus may obtain a sentence element less than a preset length by segmenting the text sentence one or more times according to a preset criterion. In this case, when the segmentation needs to be performed two or more times, the predetermined criteria may be sequentially applied, such as punctuation marks criterion, clause criteria criterion, phrase criteria criterion, word criterion, and spacing criterion. In this case, the electronic apparatus may assign the index information to each sentence element in the order of the sentence elements.

The electronic apparatus may input prosody information of the text sentence and a plurality of sentence elements to a TTS module 111 to obtain speech in which the prosody information is reflected in each of the plurality of sentence elements in parallel in operation S430. For example, the electronic apparatus may acquire speech 540-1 for sentence element 1 by synthesizing the speech by reflecting the prosody information 520 to the sentence element 1 through the TTS module 111. The electronic apparatus may acquire speech 540-2 for the sentence element 2 by synthesizing the speech by reflecting the prosody information 520 on the sentence element 2 through the TTS module 111. The electronic apparatus may acquire speech 540-n for the sentence element n by synthesizing the speech by reflecting the prosody information 520 on the sentence element n through the TTS module 111.

Figure 6:
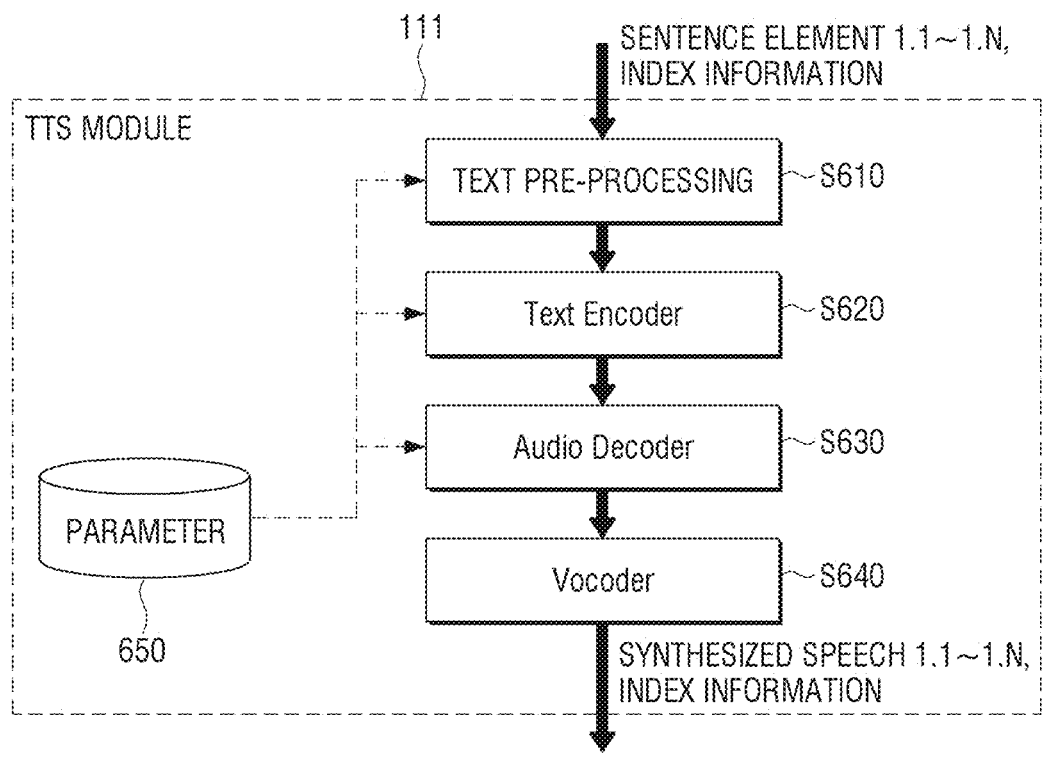
FIG. 6 is a diagram describing a speech synthesis operation of TTS module of FIG. 5.

To be specific, the TTS module 111 may synthesize the text information to speech through text preprocessing, a text encoder, audio decoder, and a vocoder using a stored parameter 650 as illustrated in FIG. 6 to describe the speech synthesis operation of the TTS module in more detail. Here, the text preprocessing, the text encoder, the audio decoder, and the vocoder may be implemented with at least one chip or software. In this case, the parameter 650 is trained, and a method of learning the parameter 650 will be described in detail with reference to FIGS. 8 and 9.

For convenience of description, only the step of synthesizing one sentence element to a speech has been illustrated in FIG. 6, but the steps of S610 to S640 may be performed in parallel for each of the plurality of sentence elements which are segmented from the text sentence. That is, n number of speech synthesis processes may be performed in parallel according to the n number of sentence elements.

Referring to FIG. 6, in the TTS module 111, a plurality of sentence elements 1.1 to 1.N and index information generated by segmenting the text sentence 1 may be input. The TTS module 111 may perform text preprocessing in operation S610 on the text information of the input sentence element. The text preprocessing may mean converting a text displayed in a language other than a preset language, such as a symbol included in the text information and a foreign language, or the like, into a preset language. For example, if the text information includes "'$,'" "$" may be converted to "dollar," which is a preset language.

The TTS module 111 may convert the preprocessed text to a code which the apparatus may process, through a text encoder in operation S620. For example, the text encoder may convert the text information to American Standard Code for Information Interchange (ASCII) code. In one embodiment, the TTS module 111 may convert "dollar" to ASCII code to "100 111 108 108 97 114." The TTS module 111 may convert the text using various standard codes such as Unicode, binary-coded decimal (BCD) code, extended binary coded decimal interchange code (EBCDIC) code, or the like, in addition to the ASCII code.

The TTS module 111 may convert the converted code into a spectrum using an audio decoder in operation S630. Here, the spectrum may be distribution of an energy value by frequencies, and the TTS module 111 may convert the code to the spectrum through a database. The TTS module 111 may convert the code into the spectrum by reflecting the prosody information 520 of the text sentence.

As described above, each sentence element is reflected with the prosody information of the entire text sentence and speech is synthesized, and the synthesized speech may have common prosody with respect to the plurality of sentence elements. In addition, by speech synthesizing of the plurality of sentence elements having the length that is shorter than the text sentence simultaneously, time required for speech synthesis may be reduced.

The TTS module 111 may synthesize the spectrum to sound using the vocoder in operation S640. That is, the synthesized speeches 1.1 to 1.N may be obtained with respect to the N number of sentence elements. Here, the synthesized speeches 1.1 to 1.N may correspond to the speeches 540-1, 540-2, . . . , 540-n with respect to the plurality of sentence elements of FIG. 5.

In addition, the electronic apparatus may merge the speeches 540-1, 540-2, . . . , 540-n for the plurality of sentence elements acquired in parallel and obtain the merged speech 550 for the text sentences in operation S440. To be specific, the electronic apparatus may merge the speech 540-1, 540-2, . . . , 540-n for the plurality of obtained sentence elements based on the index information, and obtain the merged speech 550 for the entire text sentence. Meanwhile, regarding FIG. 5, it has been described that the speech is merged in the TTS module 111. However, in the actual implementation, only the speech synthesis may be performed in the TTS module 111, and the speech merging operation may be replaced with an operation to sequentially output the speech 540-1, 540-2, . . . , 540-n for the plurality of sentence elements.

Figure 7:
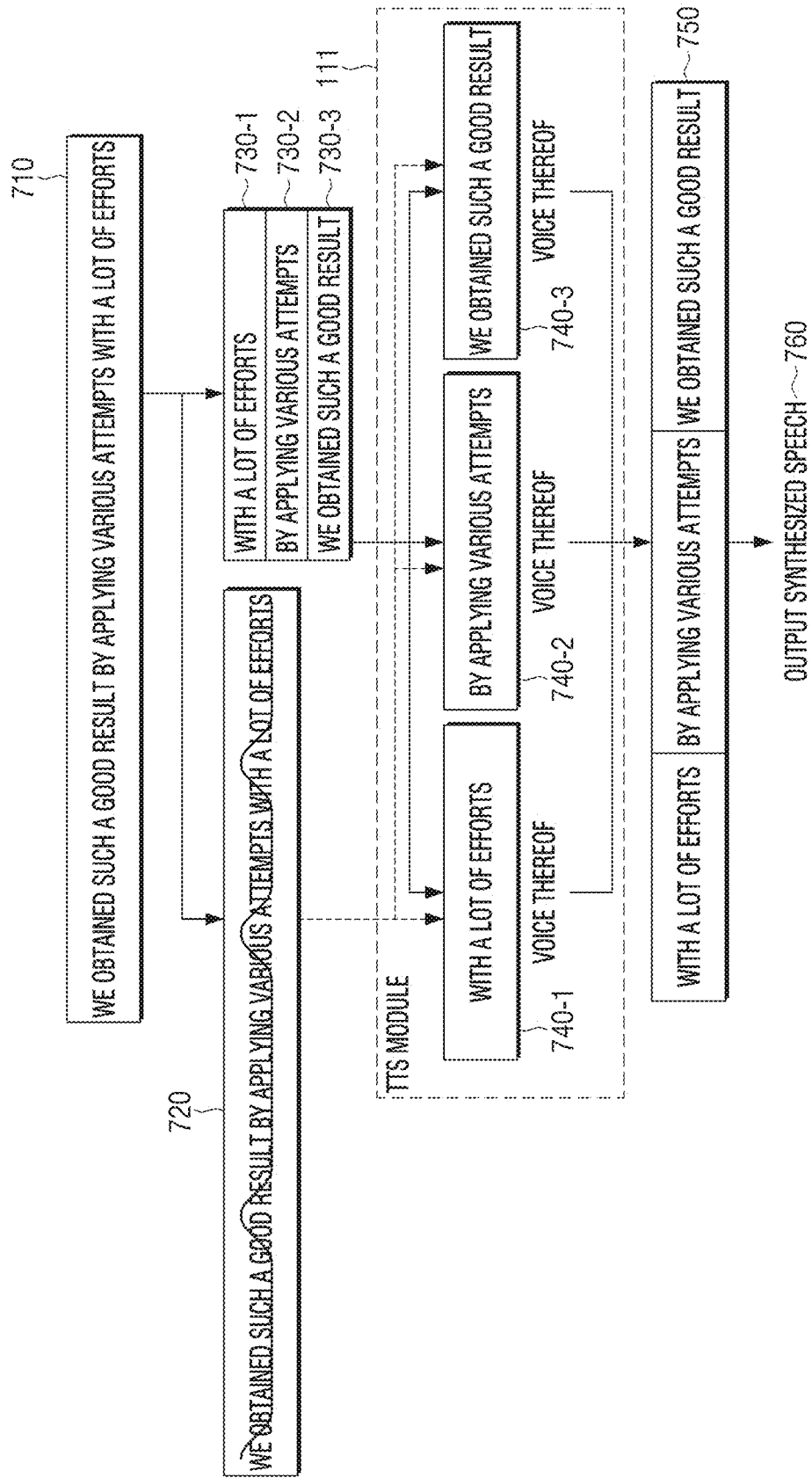
FIG. 7 is a flowchart of a method of applying speech synthesis according to an embodiment.

FIG. 7 is a flowchart of a method of applying speech synthesis method of FIGS. 4-6 described above.

Referring to FIG. 7, for example, when a text sentence 710 "we obtained such a good result by applying various attempts with a lot of efforts" is input, the electronic apparatus may obtain prosody information 720 of the entire text sentence 710. Specifically, the electronic apparatus may analyze the text sentence 710, and obtain the prosody information including phonetic information, accent information, and intonation information using that the text sentence 710 is a declarative sentence, an affirmative sentence form, syntactic structure, context, or the like.

In addition, the electronic apparatus may segment the text sentence 710 into a plurality of sentence elements 730. To be specific, the electronic apparatus may segment the text sentence 710 such that the processing time required to perform the speech synthesis for the plurality of sentence elements 730-1, 730-2, and 730-3 in parallel is less than a preset time. For example, the electronic apparatus may segment the text sentence 710, "we obtained such a good result by applying various attempts with a lot of efforts" into three sentence elements of "with a lot of efforts" 730-1, "by applying various attempts" 730-2, and "we obtained such a good result" 730-3. In this case, when it is estimated that the time required to speech-synthesize the sentence element even after segmenting the text sentence 710 based on the punctuation marks exceeds a predetermine time, the long sentence element may be segmented again based on the phrase. The electronic apparatus may assign index information related to the order to each sentence element. In the meantime, the specific sentence segmentation process will be described with reference to FIGS. 10 to 12.

The electronic apparatus may reflect the prosody information 720 to each of the plurality of sentence elements 730-1, 730-2, and 730-3 through the TTS module 111, and perform the speech synthesis in parallel.

Specifically, the electronic apparatus may synthesize speech 740-1 for "with a lot of efforts" by reflecting the prosody information 720 to the sentence element "with a lot of efforts 730-1" through the TTS module 111. The electronic apparatus may synthesize the speech 740-2 for "by applying various attempts" by reflecting the prosody information 720 to the sentence element "by applying various attempts" through the TTS module 111. The electronic apparatus may synthesize the speech 740-3 for "we obtained such a good result" by reflecting the prosody information 720 to the sentence element "we obtained such a good result 730-3" through the TTS module 111.

The electronic apparatus may merge the plurality of obtained speeches 740-1, 740-2, and 740-3 and obtain the speech 750 for the entire text sentence 710. The electronic apparatus may merge the plurality of speeches 740-1, 740-2, and 740-3 based on the index information included in each sentence element.

The electronic apparatus may output the synthesized speech 760.

As described above, the prosody information of the entire text sentence is reflected and synthesized in each sentence element, so that the speech synthesized for the plurality of sentence elements may have a common prosody. In addition, it is possible to reduce the overall processing time required for speech synthesis by simultaneously synthesizing a plurality of sentence elements having a shorter length than the text sentence.

Figure 8:
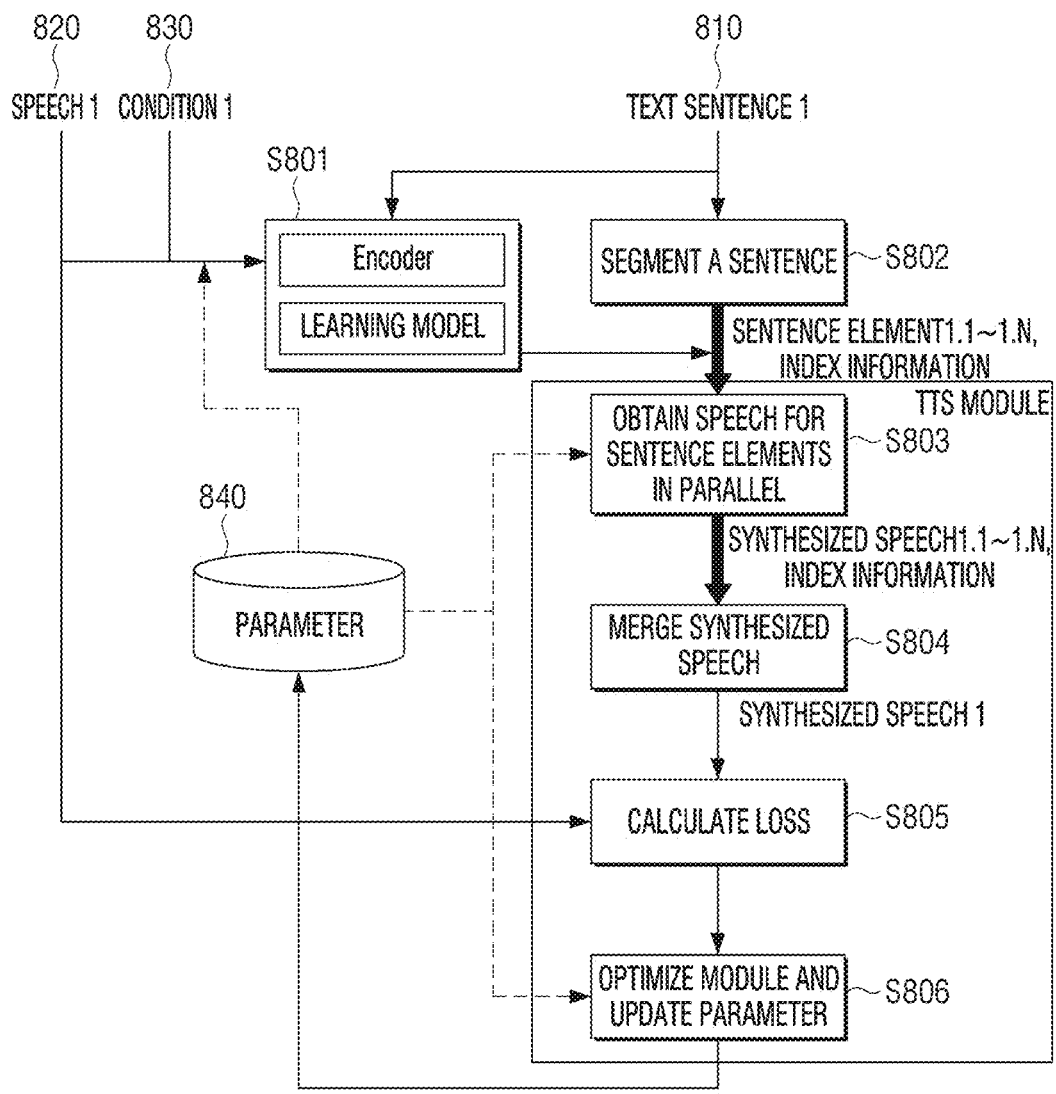
FIG. 8 is a diagram describing a training operation of the TTS module.
Figure 9:
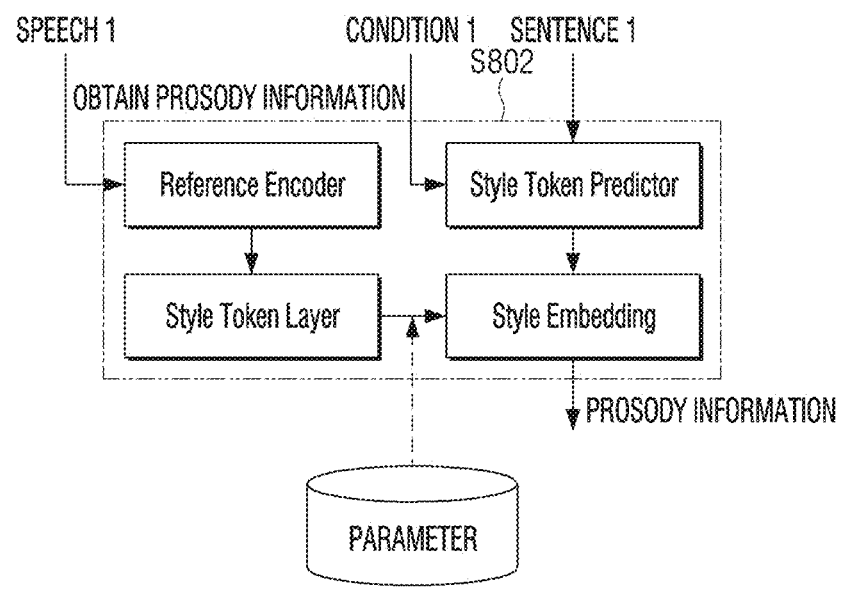
FIG. 9 is a diagram describing a training operation of the TTS module according to an embodiment.

FIGS. 8 and 9 are diagrams describing a training operation of the TTS module. In FIGS. 8 and 9, the process of processing a plurality of sentence elements in parallel is displayed in a thick arrow. In the meantime, the parameter 740-$n$ may include at least one parameter that is applied to each step.

Referring to FIG. 8, the electronic apparatus may receive a text sentence 1 810 to train a parameter 840 of the TTS module, a speech 1 820 corresponding to the text sentence 1, and a condition 1 830.

During training, training by speakers may proceed to assign unity of speech style and prosody, and if a plurality of speakers or various speech styles are trained at the same time, additional metadata for dividing speakers and speech styles may be added to appropriately perform the training for the speakers or speech styles.

Here, the condition 1 830 is the metadata delivered to the TTS module in addition to language information, and may be information to add prosody to synthesized speech for text sentence 1 810. For example, condition 1 830 may include speed of speech, emotional information such as sorrow, joy and anger, language information such as Korean or English, intonation information such as a dialect, or the like.

The electronic apparatus may acquire prosody information of the text sentence 1 810 based on the input text sentence 1 810, the speech 1 820, and the condition 1 830 in operation S801. To be specific, the electronic apparatus may convert the text sentence 1 810 into a code that may be processed by the apparatus through an encoder. The electronic apparatus may input the converted code into the learning model to obtain prosody information of the entire text sentence 1 810. For example, the learning model may be a deep neural network (DNN). The learning model may be trained to acquire different prosody information according to speech styles by a plurality of speakers.

Specifically, the electronic apparatus may generate the prosody information using at least one of the numeral characteristic such as the sentence format and the number of phrases of text sentence 1 810 through the learning model, semantic characteristic such as syntactic structure, affirmative or negative of the entire sentence, emotional state, or the like, and contextual characteristic of metadata format such as a style token, and modify the generated prosody information by reflecting the condition 1 830. In addition, further considering the prosody information of the speech 1 820 that is a real speech of the text sentence 1 810, the electronic apparatus may iteratively modify the modified prosody information.

The electronic apparatus may segment the text sentence 1 810 in operation S802. Specifically, the electronic apparatus may segment the text sentence 1 810 into a plurality of sentence elements 1.1 to 1.N so that processing time less than a predetermined time is required to synthesize speech. In this case, each of the plurality of sentence elements 1.1 to 1.N may include the index information related to the order in the text sentence 1 810.

The electronic apparatus may acquire the speech for the segmented sentence element in parallel in operation S803. In this case, the electronic apparatus may synthesize speech for the sentence element using the pre-stored parameter 840. To be specific, the electronic apparatus may obtain the synthesized speech by reflecting the obtained prosody information in synthesizing the plurality of sentence elements. A detailed speech synthesis process has been described with reference to FIGS. 5 and 6, and thus a redundant description is omitted.

The electronic apparatus may merge the synthetic speech based on synthesized speech 1.1. to 1.N for the plurality of sentence elements obtained in parallel and the index information included in each speech in operation S804. To be specific, by merging speech 1.1 to 1.N sequentially based on the index information, the electronic apparatus may obtain synthesized speech 1. At this time, the synthesized speech 1 may be a speech for text sentence 1.

The electronic apparatus may calculate loss by comparing the obtained synthesized speech 1 with the speech 1 820 in operation S805. To be specific, the electronic apparatus may obtain loss of synthesized speech 1 by comparing frequency characteristics such as frequency, amplitude, frequency, decibel, and spectrum between synthesized speech 1 and speech 1 820, optimize the module so that synthesized speech 1 corresponds to speech 1 820, and update the parameter 820 in operation S806.

As illustrated in FIG. 9, the electronic apparatus may obtain the prosody information based on the style token in operation S802. Here, the style token may mean an arbitrary factor to determine a style including the prosody information of speech. For example, the style token may be a global style token (GST).

Specifically, the style token may be a plurality of pre-stored arbitrary elements, and a weight may be assigned to each arbitrary element according to the speech style. The electronic apparatus may sum up a weighted arbitrary element to obtain a desired speech style. For example, if speech synthesis is performed based on a style generated by merging weighted style tokens, the speaker (a female, a male, a celebrity, or the like), emotional and personality states (joy, anger, busyness, tenderness, bluffness), or the like may be expressed. In this case, the parameter for the weight for each style token according to the speech style may be stored after learning.

Referring to FIG. 9, the electronic apparatus may predict a style token based on sentence 1 which is a text sentence and condition 1 corresponding to sentence 1. In detail, the electronic apparatus may predict weights of a plurality of style tokens to be applied to synthesize a sentence 1 of a text sentence into speech using condition 1 including emotional information and intonation information, or the like. In this case, the electronic apparatus may predict the weight for each style token to be applied to speech synthesis of sentence 1 using the weight included in the pre-stored plurality of styles.

The electronic apparatus may convert the prosody information in various lengths of speech 1 to a vector of a predetermined length to acquire the style token for speech 1 corresponding to sentence 1 (reference encoder). The electronic apparatus may acquire the weights by a plurality of prestored style tokens by analyzing the converted vector (style token layer).

The electronic apparatus may acquire the weights for each style token in further consideration of the weights for each of the style tokens obtained from speech 1, which is a real speech for the predicted style tokens, and by adding the style tokens reflected with the acquired weights, obtain the style (style embedding).

In addition, the electronic apparatus may use the style information obtained when synthesizing the speech for the plurality of sentence elements in parallel as prosody information. Specifically, the electronic apparatus may synthesize a plurality of sentence elements obtained by segmenting sentence 1 by using prosody information obtained using the style token, and merge the synthesized speech to obtain the speech for sentence 1. By comparing the merged speech and input speech 1, the parameter may be updated so that the merged speech matches speech 1.

Figure 10:
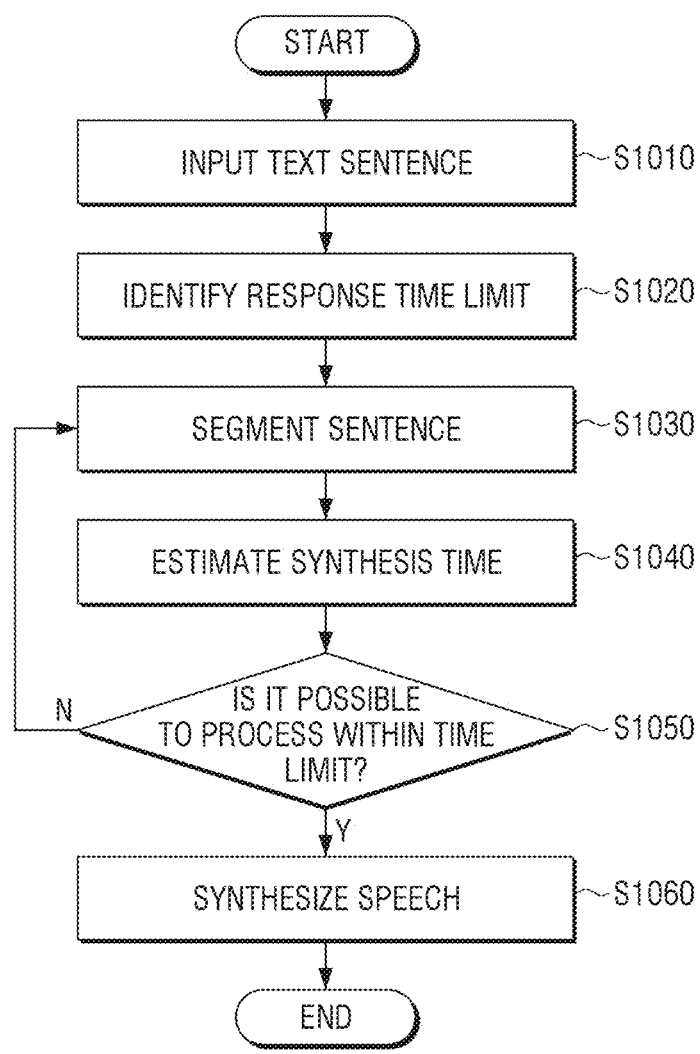
FIG. 10, FIG. 11, and FIG. 12 are flowcharts and diagrams describing a method of segmenting a text sentence according to an embodiment.
Figure 11:
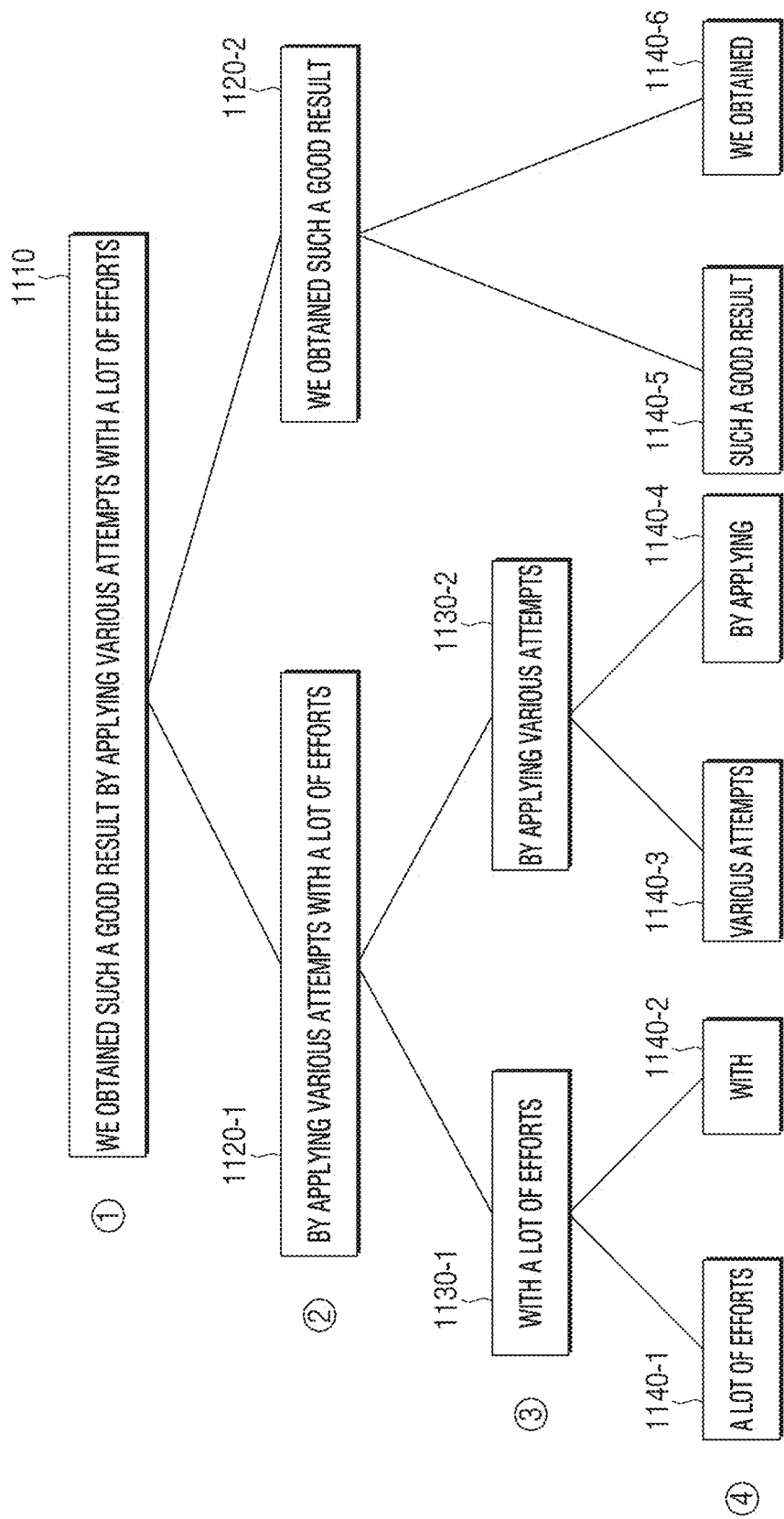
Figure 12:
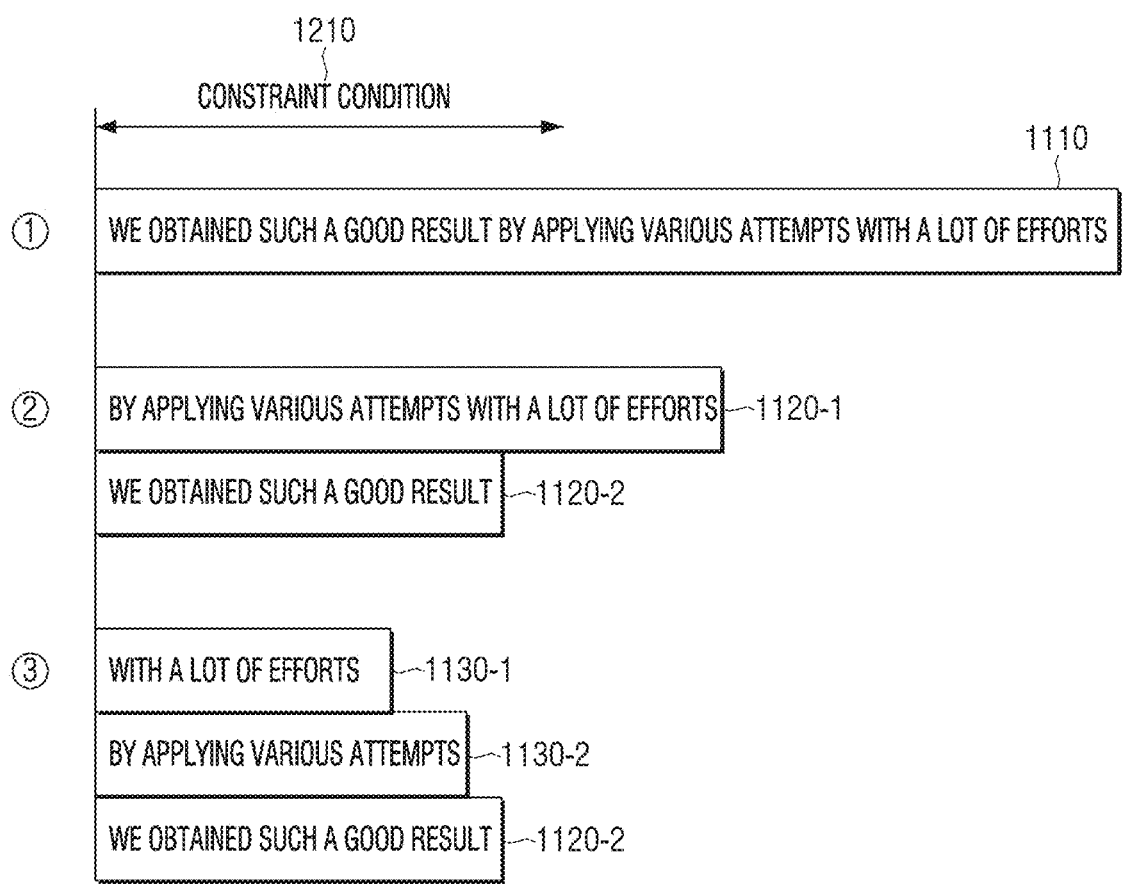

FIGS. 10 to 12 are flowcharts and diagrams describing a method of segmenting a text sentence according to an embodiment.

The electronic apparatus may receive a text sentence in operation S1010. For example, as illustrated in FIG. 11, a text sentence 1110 of "we obtained such a good result by applying various attempts with a lot of efforts" may be input.

The electronic apparatus may identify a response time limit in operation S1020. Here, the response time limit may be a time limit for providing a response speech to the user. When time that is longer or equal to the identified time limit is necessary for providing the response speech, the user may feel that the dialogue is unnatural. This response time limit may be preset at the time of manufacturing by a manufacturer, or may be set by the user.

For example, as illustrated in FIG. 12, the electronic apparatus may identify the maximum response time limit allowed for providing the response speech as a constraint condition 1210. The electronic apparatus may segment the text sentence 1110 into a plurality of sentence elements so that the length of the sentence element and the processing time required for the speech synthesis of the sentence element are less than the constraint condition 1210 in operation S1030. Specifically, because the length of the text to be synthesized and the speech synthesis time are proportional to each other, the time required for speech synthesis may be estimated based on the length of the text to be synthesized. In this case, the time required for speech synthesis may be estimated in a statistical manner based on the performance of the apparatus on which speech synthesis is performed.

For example, when the speech synthesis is performed in a server based on the statistics, if it is assumed that about 0.1 second is required for speech synthesis when the length of a sentence is 20 frames, and the speech synthesis is performed by a terminal device, and when the length of the sentence is 20 frames, and about 0.2 seconds is spent for the speech synthesis, if a text sentence of which the sentence length is 40 frames is input and the speech synthesis is performed in a server, it may be estimated that about 0.2 seconds will be spent for the speech synthesis, and if the speech synthesis is performed in a terminal device, it may be estimated that about 0.4 seconds will be spent for the speech synthesis.

Here, the frame refers to a processing unit in the speech synthesis process. A sample may be generated by capturing a continuous speech signal at a specific sampling rate, and the predetermined number of samples may be referred to as one frame. For example, when the electronic apparatus captures a speech signal for about 16000 times for one second and generates about 16000 samples, and processes the generated samples by 1024, the 1024 samples may form one frame. In this case, 1 frame may be about 64 ms. The length of the frame may vary depending on the sampling rate and the number of samples forming one frame, but the number of frames based on the length of the sentence may be determined based on statistics, and the time required for speech synthesis based on the number of frames may be predicted.

When the estimated time to be spent for speech synthesis of the text sentence 1110 is less than the constraint condition 1210, the electronic apparatus may perform the speech synthesis as the text sentence 1110. If the estimated time to be spent for speech synthesis of the text sentence 1110 is greater than or equal to the constraint condition 1210, the text sentence 1110 may be segmented based on a predetermined condition.

To be specific, the text sentence 1110 may be segmented based on the tree structure illustrated in FIG. 11. First, the electronic apparatus may segment the text sentence 1110 into a plurality of sentence elements 1120-1 and 1120-2 based on the first criterion. For example, the electronic may segment the text sentence "we obtained such a good result by applying various attempts with a lot of efforts" 1110 based on the punctuation marks, and obtain the sentence element "by applying various attempts with a lot of efforts" 1120-1 and the sentence element "we obtained such a good result" 1120-2.

The electronic apparatus may estimate the synthesis time for the plurality of obtained sentence elements in operation S1040. The electronic apparatus may determine whether the speech synthesis may be processed within the time limit by processing the sentence elements in parallel based on the estimated synthesis time in operation S1050.

For example, as illustrated in FIG. 12, the electronic apparatus may determine whether the processing time required for synthesizing the sentence element "by applying various attempts with a lot of efforts" 1120-1 to speech is less than the constraint condition 1210. The electronic apparatus may determine whether the time spent for "we obtained such a good result" 1120-2 is less than the constraint condition 1210. In this case, because the plurality of sentence elements 1120-1 and 1120-2 are speech synthesized in parallel, the electronic apparatus may simultaneously start the speech synthesis of the plurality of sentence elements 1120-1 and 1120-2, and determine whether the time which is required for synthesizing of the all the plurality of sentence elements 1120-1 and 1120-2 is less than the constraint condition 1210.

In this case, if it is predicted that the speech synthesis will require processing time longer than a time limit in operation S1050-N, the electronic apparatus may segment the sentence element based on the second criterion in operation S1030. Here, the second criterion may be for shortening the length of the sentence element than the first than the first criterion.

For example, as illustrated in FIG. 11, the electronic apparatus may segment the sentence element "by applying various attempts with a lot of efforts" 1120-1 into the sentence element "with a lot of efforts" 1130-1 and "by applying various attempts" 1130-2 based on the clause criterion.

In the meantime, the sentence element "we obtained such a good result" 1120-2, which is identified such that the estimated time for speech synthesis is less than the constraint condition 1210, may not be further segmented.

The electronic apparatus may estimate the synthesis time for the plurality of sentence elements obtained based on the second criterion in operation S1040, and determine whether the speech synthesis may be processed within the time limit, based on the estimated synthesis time in operation S1050.

For example, as illustrated in FIG. 12, the electronic apparatus may determine whether the estimated processing time required for the sentence element "with a lot of efforts" 1130-1 to be synthesized to the speech is less than the constraint condition 1210. In addition, the electronic apparatus may predict whether the estimated time taken to synthesize the "by applying various attempts" 1130-2 to the speech is less than the constraint condition 1210. In this case, because the plurality of sentence elements 1130-1, 1130-2, and 1120-2 are speech synthesized in parallel, the electronic apparatus may start the speech synthesis for the plurality of sentence elements 1130-1, 1130-2, and 1120-2 simultaneously, and determine whether the estimated time for speech synthesizing of all the plurality of sentence elements 1130-1, 1130-2, and 1120-2 to the speech is less than the constraint condition 1210.

In this case, if it is predicted that the estimated time for synthesizing all sentence elements in parallel is less than the time limit in operation S1050-Y, the electronic apparatus may synthesize the obtained plurality of sentence elements into speech in operation S1060. To be specific, the electronic apparatus may input a plurality of sentence elements to the TTS module to perform speech synthesis in parallel.

According to an embodiment, if the constraint condition 1210 is shorter and the sentence element obtained by the second criterion is longer than the constraint condition 1210, the electronic apparatus may obtain a shorter sentence element by applying the third criterion to obtain the sentence element that is shorter than the second criterion.

For example, as illustrated in FIG. 11, a plurality of sentence elements 1130-1 and 1130-2 obtained by segmenting based on a clause and a sentence element 1120-2 obtained by segmenting based on a punctuation mark may be segmented based on the third criterion which is a phrase criterion to obtain a plurality of sentence elements 1140-1, 1140-2, 1140-3, 1140-4, 1140-5, and 1140-6.

Referring to FIG. 13, it may be identified that the prosody information of each of "You like Samsung" 1310, "You like Samsung?" 1320, "Do you like Samsung?" 1330, and "You like Samsung, don't you?" 1340 is different from each other. In particular, it can be confirmed that each text sentence 1310, 1320, 1330, and 1340 includes "you like Samsung" having a different prosody according to sentence format, syntactic structure, context, emotional information, or the like.

Figure 14:
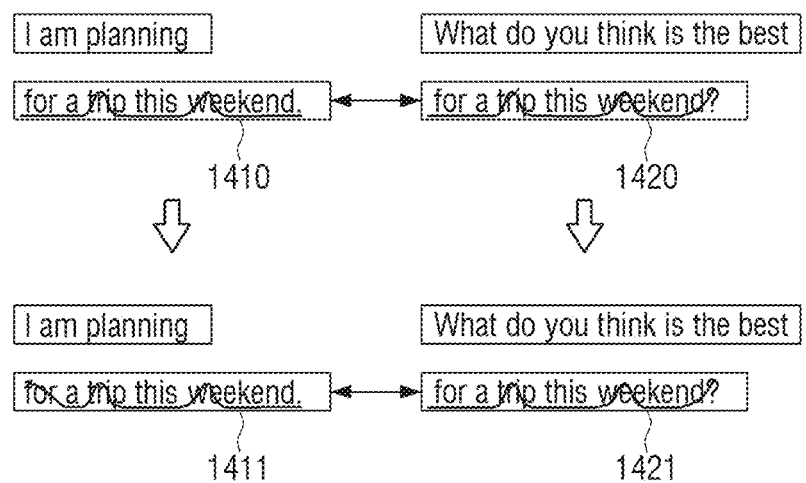

Referring to FIG. 14, "for a trip this weekend." 1410 which is a part of "I am planning for a trip this weekend." and "for a trip this weekend?" 1420 which is a part of "What do you think is the best for a trip this weekend?" are the same as a text, and if the prosody information of the entire text sentence is not reflected, and the segmented speech synthesis is performed, "for a trip this weekend." 1410 and "for a trip this weekend?" 1410 may be synthesized with the same prosody. In this case, when the synthesized speech for each of the segmented sentence elements is merged, the speech may be unnatural. In the meantime, even if "for a trip this weekend." 1410 and "for a trip this weekend?" 1420 are speech synthesized to have different prosody by punctuation marks, when a speech for one sentence is generated as the speech synthesized for "I am planning" and the speech synthesized for "What do you think is the best" are merged, each sentence element is speech synthesized independently, and the boundary of the merged speech may be unnatural.

However, according to the disclosure, when the processor 120 segments a text sentence and performs a speech synthesis in parallel by reflecting prosody information of the entire text sentence, respectively, each sentence element "for a trip this weekend." 1411 and "for a trip this weekend?" 1421, although the texts are the same, the speech may be synthesized to have different prosodies based on the prosody information of the text sentence.

Figure 15:
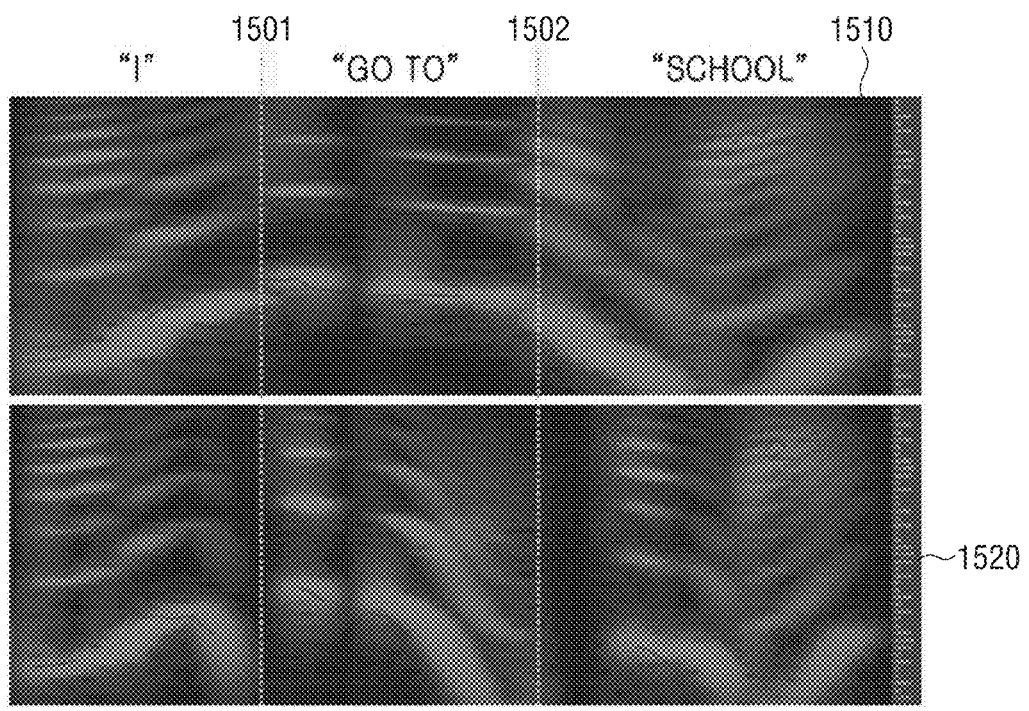
FIG. 15 is a view to describe a difference of prosody of a synthesized speech when speech synthesis is performed in reflection of the prosody information according to an embodiment.

Specifically, FIG. 15 illustrates a pitch of speech, which is one of prosody information. Here, the pitch of the speech may be the height of the sound and is based on the number of vibrations of the sound.

Referring to FIG. 15, it is illustrated the pitch of the speech that is obtained by segmenting the text sentence "I go to school" into sentence elements "I," "go to" and "school," speech synthesizing in parallel, and merging. Specifically, referring to a result 1510 reflecting the prosody information of the entire text sentence in speech synthesizing each sentence element, it is confirmed that the pitch of the speech is naturally connected even at the boundaries 1501 and 1502 of the sentence element. Through this, a user may feel that the entire speech "I go to school" is one sentence without unnaturalness.

In the meantime, referring to a result 1520 not reflecting the prosody information of the entire text sentence in speech synthesis of each sentence element, it may be confirmed that the pitch of the speech is not connected in the boundary 1501 and 1502 of the sentence element. In other words, the user may feel unnaturalness from the entire speech "I go to school" as one sentence.

Figure 16:
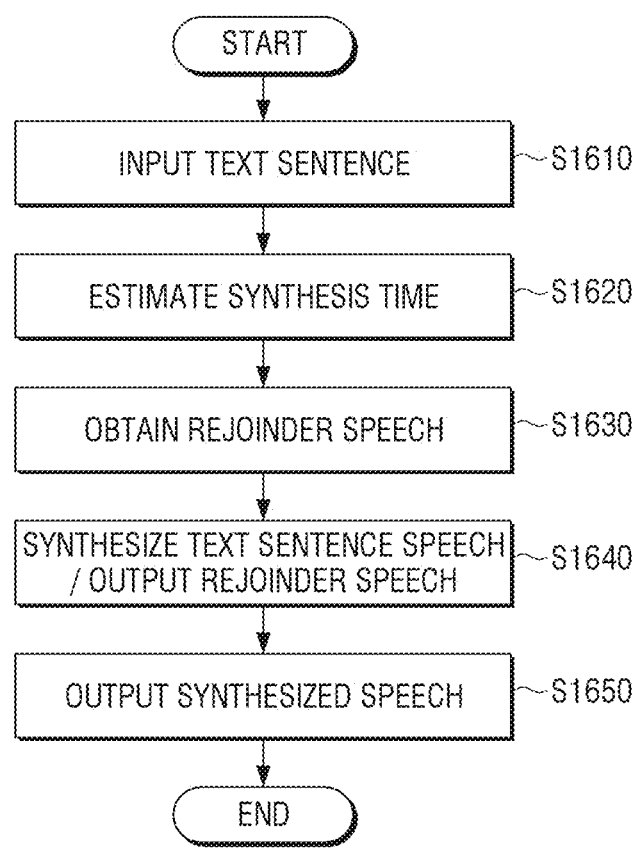
FIG. 16 is a flowchart of a method of outputting a rejoinder speech during speech synthesis according to an embodiment.

FIG. 16 is a flowchart of a method of outputting a rejoinder speech during speech synthesis.

Referring to FIG. 16, the electronic apparatus may receive a text sentence in operation S1610. In this case, the electronic apparatus may receive the text sentence together with the feature information corresponding to the text sentence. Here, the feature information may include language information of the text sentence, emotional information of the text sentence, information on the speaker (for example, the gender of the speaker, a specific person, etc.), or the like.

The electronic apparatus may estimate the time to be spent for speech synthesis of the text sentence in operation S1620. For example, the electronic apparatus may estimate the processing time required for the speech synthesis based on the length of the text sentence.

The electronic apparatus may obtain the rejoinder speech based on the estimated synthesis time in operation S1630. Specifically, if the estimated synthesis time exceeds the time limit, the electronic apparatus may acquire the rejoinder speech, and the length of the rejoinder speech may be determined in proportion to the estimated synthesis time. In this case, the electronic apparatus may determine the length of the rejoinder speech based on the time required to sequentially synthesize the text sentences, or determine the length of the rejoinder speech based on the time required to segment the text sentences and synthesize the speech in parallel.

Figure 17:
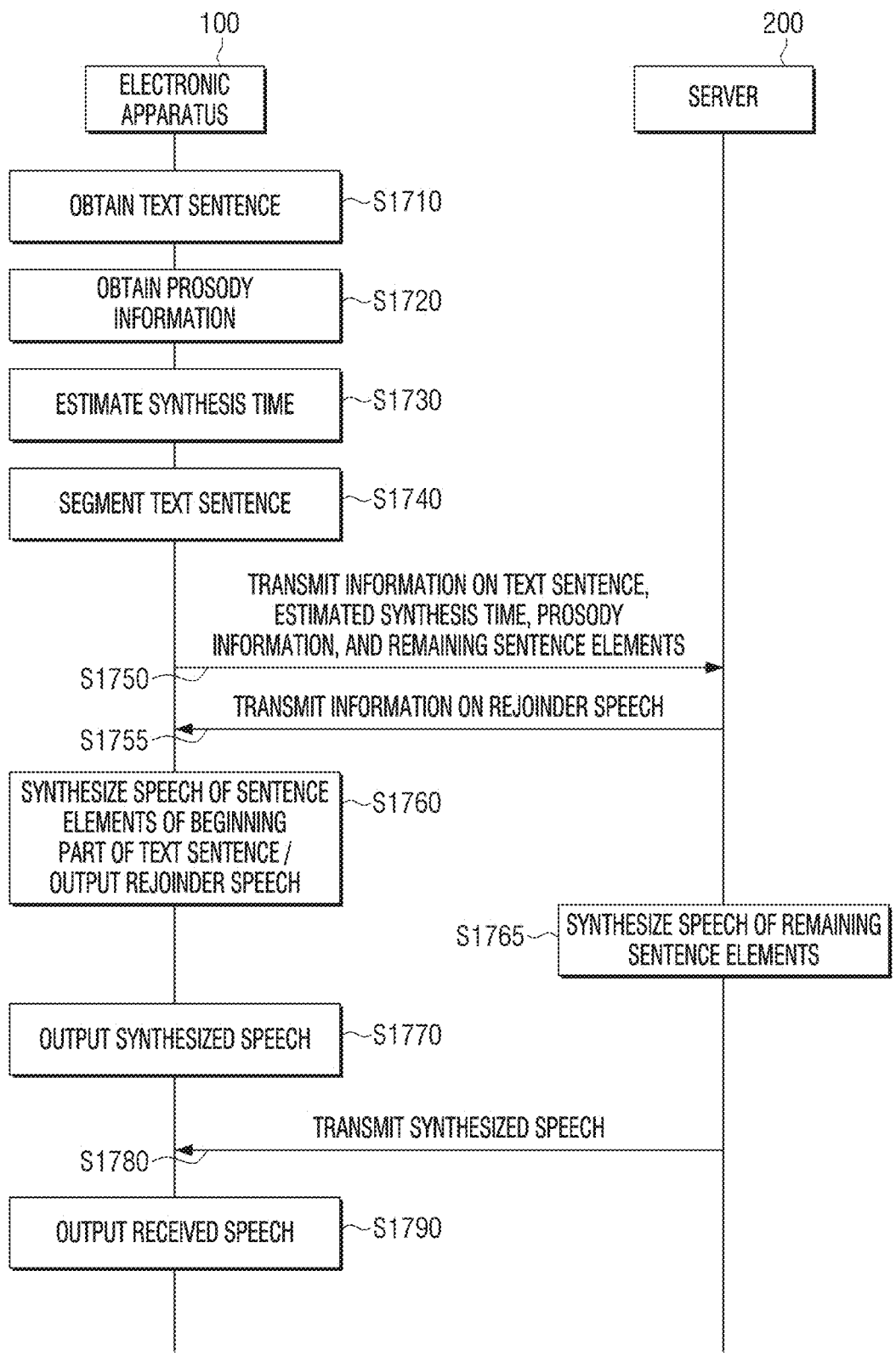
FIG. 17 is a sequence diagram illustrating speech synthesis of at least a portion of the text sentence in an external server according to an embodiment.

Here, the rejoinder speech may be selected from a plurality of recorded speech pre-stored in the electronic apparatus, or may be selected among the plurality of rejoinder texts pre-stored in the electronic apparatus and speech synthesized by the TTS module. Alternatively, the rejoinder speech may be obtained by reusing the previously reproduced speech signal by a caching method, or the like, in consideration of throughput and bandwidth efficiency. In another embodiment, the rejoinder speech may be received from an external device as shown in FIG. 17 as well as stored in the electronic apparatus.

In addition, the electronic apparatus may select a rejoinder speech based on feature information corresponding to the text sentence. For example, when the feature information includes information on an identity of a specific person as a speaker, the electronic apparatus may acquire the rejoinder speech based on information on the gender, frequently used rejoinder, or the like, of the corresponding person.

The electronic apparatus may output the acquired rejoinder speech, while performing speech synthesis for the input text sentence in operation S1640. In this case, the electronic apparatus may output the rejoinder speech while sequentially speech synthesizing the entire text sentence. Alternatively, the electronic apparatus may output the rejoinder speech while performing the speech synthesis on the segmented sentence elements in parallel by reflecting the prosody information for the entire text sentence after segmenting the text sentence. Alternatively, the electronic apparatus may output the rejoinder speech while performing speech synthesis of only the beginning part of the text sentence.

As a still another embodiment, while the speech synthesis is being performed by an external device, the electronic apparatus may output the rejoinder speech, and this will be further described with reference to FIG. 17.

The electronic apparatus may output the synthesized speech after outputting the rejoinder speech in operation S1650. To be specific, the synthesized speech for the text sentence may be output while the rejoinder speech is output. In this case, if the synthesized speech is a speech for the entire text sentence, the electronic apparatus may continue to output the synthesized speech. In the meantime, if the synthesized speech corresponds to the beginning part of the text sentence, the electronic apparatus may output the synthesized speech and perform speech synthesis on the text after the beginning part.

As described above, by outputting the rejoinder speech while performing the speech synthesis, latency a user may feel may be reduced, and more natural AI dialogue system may be implemented.

FIG. 17 is a sequence diagram illustrating speech synthesis of at least a portion of the text sentence in an external server.

Referring to FIG. 17, the electronic apparatus 100 may obtain a text sentence in operation S1710. To be specific, the electronic apparatus 100 may recognize input speech received from the microphone or an external device, and obtain a response text sentence corresponding to the recognized speech. Meanwhile, the electronic apparatus 100 may receive a text sentence from an external device. In this case, the electronic apparatus may obtain the text sentence together with the feature information corresponding to the text sentence. Here, the feature information may include language information of the text sentence, emotional information of the text sentence, information on the speaker (for example, the gender of the speaker, a specific person, etc.), or the like.

The electronic apparatus 100 may obtain prosody information of the entire text sentence in operation S1720.

The electronic apparatus 100 may estimate a time required for speech synthesis of the text sentence in operation S1730. To be specific, the electronic apparatus 100 may determine the length of the rejoinder speech based on the estimated synthesis time. In this case, if the estimated time for speech synthesis of the text sentence is greater than or equal to the time limit, the electronic apparatus 100 may segment the text sentence based on a preset condition in operation S1740. The text sentence segmentation operation has been described in detail with reference to FIGS. 10 to 12, and a redundant description will be omitted.

The electronic apparatus 100 may transmit, to the server 200, remaining sentence elements and prosody information except some sentence elements among a plurality of sentence elements obtained by segmenting a text sentence for speech synthesis in operation S1750. In this case, the electronic apparatus 100 may transmit, to the server 200, a sentence element other than at least one sentence element corresponding to a beginning portion of the text sentence.

The electronic apparatus 100 may transmit, to the server 200, information on the text sentence for the rejoinder speech and the estimated synthesis time in operation S1750. The information on the text sentence is the feature information corresponding to the text sentence including a type of test languages and information on a speaker, or the like, and may be shared by the electronic apparatus 100 and the server 200 as a metadata format.

The server 200 may transmit the selected rejoinder speech information to the electronic apparatus 100 based on the information on the text sentence and the estimated synthesis time in operation S1755. In this case, the rejoinder speech information may be a recording file stored in the server 200, the rejoinder speech file synthesized by the server 200, the text information about the rejoinder speech, or the like. If the electronic apparatus 100 receives the text information on the rejoinder speech from the server 200, the electronic apparatus 100 may synthesize the rejoinder speech using the TTS module and output the synthesized speech.

FIG. 17 illustrates that the rejoinder speech is received from the server 200, but the speech synthesized by the TTS module provided in the electronic apparatus 100 may be output as the rejoinder speech.

FIG. 17 illustrates that the rejoinder speech is output, but the rejoinder speech output operation is optional. If the rejoinder speech is not output, the step of transmitting the rejoinder speech information from the server 200 to the electronic apparatus 100 and the step of outputting the rejoinder speech in operation S1755 may be omitted.

The electronic apparatus 100 may synthesize the speech for the sentence element of the beginning part of the text sentence, which is not transmitted to the server 200, and output the rejoinder speech while the speech synthesis is being performed in operation S1760.

The server 200 may synthesize the speech for the remaining sentence elements received from the electronic apparatus 100 in operation S1765. In this case, the server 200 may perform speech synthesis on the sentence elements in parallel by reflecting prosody information of the entire text sentence received from the electronic apparatus 100, respectively. As a result, similarity between the styles of the speech synthesized by the electronic apparatus 100 and the speech synthesized by the server 200 may be maintained.

The electronic apparatus 100 may output the synthesized speech for the sentence element of the beginning part of the text sentence in operation S1770. If the electronic apparatus 100 has been outputting the rejoinder speech, the electronic apparatus 100 may complete to output the rejoinder speech, and then output the synthesized speech with respect to the sentence element of the beginning part of the text sentence.

The electronic apparatus 100 may receive the synthesized speech from the server 200 in operation S1780. To be specific, the electronic apparatus 100 may receive the synthesized speech with respect to the remaining sentence elements except the beginning part of the text sentence from the server 200.

FIG. 17 illustrates that the server 200 receives the synthesized speech after the electronic apparatus 100 outputs the synthesized speech, but receiving of the synthesized speech from the server 200 may resume before or during the output of the synthesized speech by the electronic apparatus 100.

The electronic apparatus 100 may output a speech received from the server 200 in operation S1790. To be specific, the electronic apparatus 100 may output synthesized speech for the remaining sentence elements except for the beginning part of the text sentence received from the server 200. That is, the electronic apparatus 100 may first output the synthesized speech for the beginning part of the text sentence, and then output the synthesized speech for the remaining sentence elements received from the server 200.

As such, by first synthesizing the beginning part of the text sentence by the electronic apparatus 100 and outputting the same, the response speech output is available within a shorter time than speech synthesizing the entire text sentence by the server 200.

In the meantime, in FIG. 17, it is illustrated that the electronic apparatus 100 transmits the obtained information and the segmented sentence element to the server 200 after obtaining the prosody information, estimating the speech synthesis time, and performing the text sentence segmentation operation. But, when a user speech is received by the electronic apparatus 100, the received user speech may be transmitted to the server 200, and the server 200 may perform an operation such as generating a response text sentence for the user speech, obtaining the prosody information, and estimating the speech synthesis time, or the like. In this case, the server 200 may enable the electronic apparatus 100 to output the synthesized speech after outputting the rejoinder speech, by transmitting the information about the rejoinder speech to the electronic apparatus 100 based on the obtained response text information and estimated speech synthesis time, performing speech synthesis in parallel of the sentence elements which segment the text sentence, and transmitting the synthesized speech to the electronic apparatus 100.

As a still another embodiment, when the electronic apparatus 100 receives the speech, the electronic apparatus 100 may transmit the received speech to the server 200, and the server 200 may perform an operation, such as generating a response text sentence for the user speech, obtaining the prosody information, estimating the speech synthesis time, segmenting the text sentence, or the like.

In addition, the server 200 may transmit the obtained prosody information and the beginning part of the text sentence to the electronic apparatus 100. In this case, the server 200 may transmit the information about the rejoinder speech to the electronic apparatus 100 based on the obtained information of the response text sentence and the estimated speech synthesis time. The electronic apparatus 100 may output the rejoinder speech during speech synthesis by reflecting the prosody information in the beginning part of the text sentence received from the server 200.

The server 200 may perform the speech synthesis for the part transmitted to the electronic apparatus 100 from the text sentence, and transmit the synthesized speech to the electronic apparatus 100.

Figure 18:
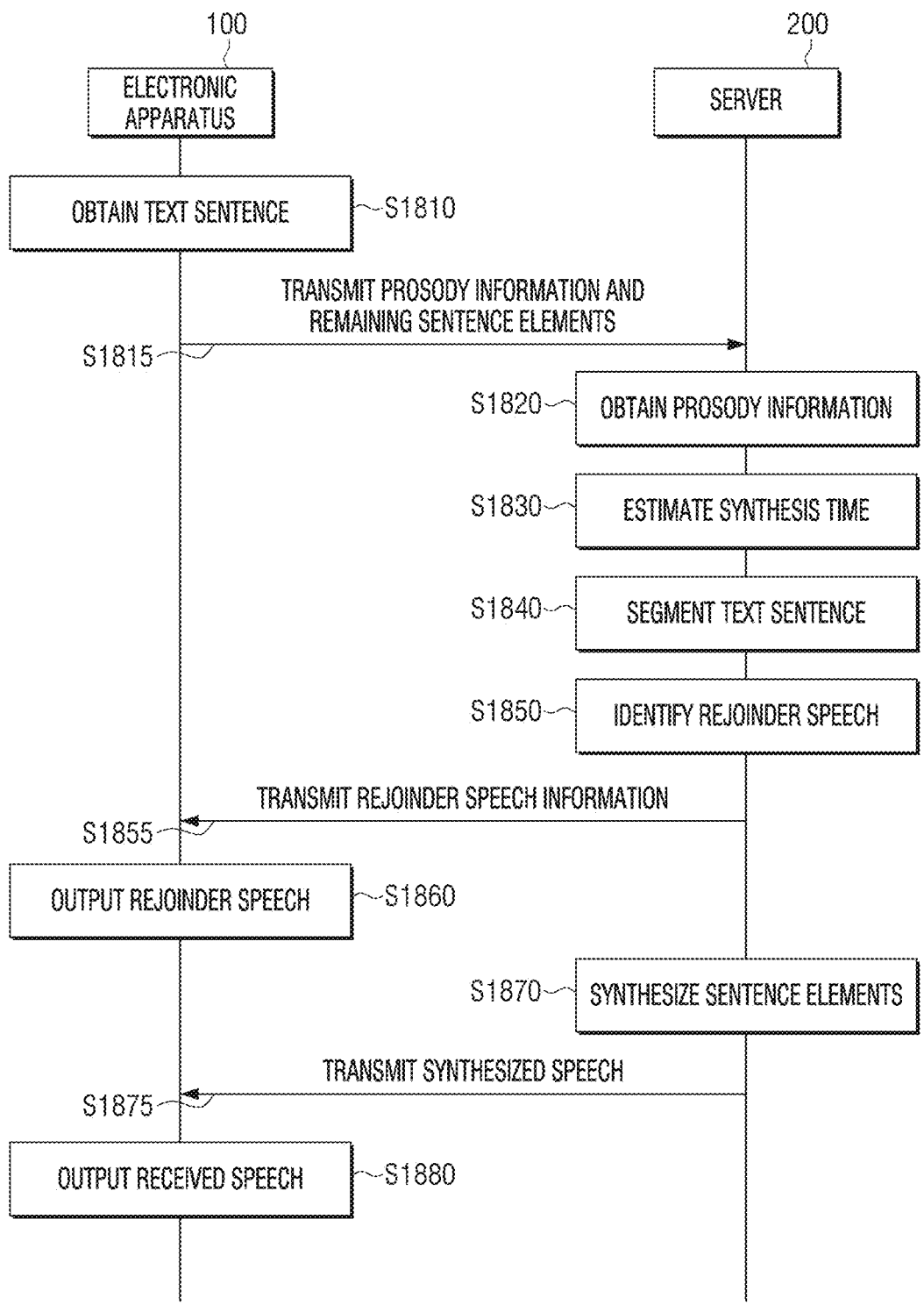
FIG. 18 is a sequence diagram illustrating speech synthesis according to an embodiment.

FIG. 18 is a sequence diagram illustrating speech synthesis including some operations performed by a server.

Referring to FIG. 18, first, the electronic apparatus 100 may obtain a text sentence in operation S1710. To be specific, the electronic apparatus 100 may recognize input speech received from the microphone or an external device, and obtain a response text sentence corresponding to the recognized speech. Meanwhile, the electronic apparatus 100 may receive a text sentence from an external device. In this case, the electronic apparatus may obtain the text sentence together with the feature information corresponding to the text sentence. The feature information may include language information of the text sentence, emotional information of the text sentence, information on the speaker (for example, the gender of the speaker, a specific person, etc.), or the like.

The electronic apparatus 100 may transmit the obtained information on the text sentence to the server 200 in operation S1815. The electronic apparatus 100 may transmit the feature information corresponding to the text sentence together.

The server 200 may obtain the prosody information of the entire text sentence received in operation S1820.

The server 200 may estimate a processing time required for speech synthesis of the text sentence in operation S1830. At this time, if the estimated processing time for speech synthesis of the text sentence is greater than or equal to the time limit, the server 200 may segment the text sentence based on a predetermined condition in operation S1840. The text sentence segmentation operation has been described in detail with reference to FIGS. 10 to 12, and a redundant description is omitted.

The server 200 may identify the speech information based on the information on the text sentence and the estimated synthesis time in operation S1850. To be specific, the server 200 may identify the length of the rejoinder speech based on the estimated synthesis time. Alternatively, the server 200 may identify the rejoinder speech based on the feature information corresponding to the text sentence including the language type of the text sentence, information on the speaker, or the like.

The server 200 may transmit the identified rejoinder speech information to the electronic apparatus 100 in operation S1855. The rejoinder speech information may be a recording file stored in the server 200, a rejoinder speech file speech-synthesized by the server 200, information on the text for the rejoinder speech, or the like.

The electronic apparatus 100 may output a rejoinder speech based on the received rejoinder speech information in operation S1860. If the server 200 transmits the rejoinder speech signal to the electronic apparatus 100, the electronic apparatus 100 may output the received rejoinder speech signal. When the electronic apparatus 100 receives text information on the rejoinder speech from the server 200, the electronic apparatus 100 may synthesize and output the rejoinder speech using the TTS module.

As a still another embodiment, when the server 200 transmits the information on the estimated synthesis time to the electronic apparatus 100, the rejoinder speech corresponding to the estimated synthesis time may be output from among the recorded speech stored in the electronic apparatus 100.

The server 200 may synthesize speech for the sentence element that segments the text sentence in operation S1870. The server 200 may reflect the prosody information of the entire text sentence respectively and perform the speech synthesis for the sentence element in parallel.

The server 200 may transmit the synthesized speech for the text sentence to the electronic apparatus 100 in operation S1875. The electronic apparatus 100 may output the synthesized speech for the text sentence received from the server 200 in operation S1880.

Meanwhile, FIG. 18 illustrates that the server 200 performs speech synthesis for the entire text sentence, but in actual implementation, the beginning part and the prosody information of the text sentence may be transmitted to the electronic apparatus 100, and the prosody information is reflected by the electronic apparatus 100 so that the beginning part of the text sentence is synthesized and output first.

Meanwhile, although FIG. 18 has been described such that the electronic apparatus 100 obtains a text sentence and the server 200 acquires prosody information about the text sentence, the electronic apparatus 100 may obtain the text sentence, obtain the prosody information for the text sentence. When the information and the prosody information on the text sentence are transmitted to the server 200, the server 200 may estimate the synthesis time and perform an operation to segment a text sentence. In still another embodiment, when the electronic apparatus 100 obtains the text sentence, obtains the prosody information, estimates the synthesis time, and transmits the information on the text information, information on the prosody information, and the information on the estimated synthesis time to the server 200, the server 200 may perform a text sentence segmentation operation based on the received information.

According to the various embodiments described above, by reflecting the prosody information of the entire text sentence in synthesizing each of the plurality of sentence elements which segments a text sentence, it is possible to implement a natural sounding AI dialogue system capable of responding quickly to a user query and outputting a natural response in reply to the user query.

The various embodiments described above may be implemented in a non-transitory computer-readable recording medium, which is readable by computer or a device similar to computer using software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor itself. According to a software implementation, embodiments such as the procedures and functions described herein may be implemented with separate software modules. Each of the above-described software modules may perform one or more of the functions and operations described herein.

The method according to the various embodiments above may be stored in a non-transitory readable medium. The non-transitory readable medium may be stored in various apparatuses for use.

The non-transitory computer readable medium refers to a medium that stores data semi-permanently rather than storing data for a very short time, such as a register, a cache, a memory or etc., and is readable by an apparatus. In detail, the aforementioned various applications or programs may be stored in the non-transitory computer readable medium, for example, a compact disc (CD), a digital versatile disc (DVD), a hard disc, a Blu-ray disc, a universal serial bus (USB), a memory card, a read only memory (ROM), and the like, and may be provided.

According to embodiments, a method disclosed herein may be provided in software of a computer program product. A computer program product may be traded between a seller and a purchaser as a commodity. A computer program product may be distributed in the form of a machine readable storage medium (e.g., CD-ROM) or distributed online through an application store (e.g., PlayStore™). In the case of on-line distribution, at least a portion of the computer program product software may be stored temporarily or at least temporarily in a storage medium such as a manufacturer's server, a server in an application store, or a memory in a relay server.

The foregoing example embodiments and advantages are merely examples and are not to be construed as limiting. The present teaching can be readily applied to other types of apparatuses. Also, the description of the example embodiments is intended to be illustrative, and not to limit the scope of the claims, and many alternatives, modifications, and variations will be apparent to those skilled in the art.

What is claimed is:

1. An electronic apparatus comprising:
a speaker;
a memory configured to store at least one instruction; and
a processor configured to execute the at least one instruction stored in the memory, wherein when the at least one instruction is executed, the at least one instruction causes the processor to:
based on obtaining a text input, obtain prosody information of the text input,
segment the text input into a plurality of segments such that a processing time for converting the plurality of segments into speech segments in parallel in the electronic apparatus is less than a predetermined time,
obtain speech segments in which the prosody information is reflected to each segment of the plurality of segments in parallel by inputting the plurality of segments and the prosody information to a text-to-speech (TTS) module, and
obtain a speech for the text input by merging the speech segments,
wherein when executing the at least one instruction, the processor is further configured to:
control the speaker to output an additional speech corresponding to the processing time for converting the plurality of segments into the speech segments and the speech for the text input after the additional speech.

2. The electronic apparatus of claim 1, wherein when executing the at least one instruction, the processor is further configured to:
obtain a plurality of first segments by segmenting the text input based on a first criterion, and based on a first processing time for converting the plurality of first segments to the speech segments being less than the predetermined time, input the plurality of first segments to the TTS module,
based on the first processing time for converting at least one first segment of the plurality of first segments to the speech segments being greater than or equal to the predetermined time, obtain a plurality of second segments by segmenting the at least one first segment based on a second criterion, and
based on a second processing time for converting the plurality of second segments to the speech segments being less than the predetermined time, input the plurality of second segments to the TTS module.

3. The electronic apparatus of claim 2, wherein the first criterion comprises a punctuation marks criterion and the second criterion comprises a clause criterion, or the first criterion comprises the clause criterion and the second criterion comprises a phrase criterion.

4. The electronic apparatus of claim 1, wherein the prosody information comprises intonation information, and accent information of the text input based on at least one of a format, a syntactic structure, and a context of the text input.

5. The electronic apparatus of claim 1, wherein each segment of the plurality of segments comprises index information that is related to an order in the text input, and
wherein when executing the at least one instruction, the processor is further configured to obtain the speech for the text input by merging the speech segments based on the index information.

6. The electronic apparatus of claim 1, wherein the TTS module is a deep neural network text-to-speech (DNN TTS) module.

7. The electronic apparatus of claim 1, wherein the memory is further configured to store a plurality of additional speeches, and
wherein when executing the at least one instruction, the processor is further configured to:
identify the additional speech from among the plurality of additional speeches based on a processing time to obtain the speech for the text input.

8. The electronic apparatus of claim 1, further comprising: a communicator,
wherein when executing the at least one instruction, the processor is further configured to:
obtain first segments of the plurality of segments in which the prosody information is reflected to each of the first segments in parallel by inputting the first segments and the prosody information to the text-to-speech (TTS) module,
transmit, to an external device for speech synthesis, a remaining segment among the plurality of segments and the prosody information through the communicator,
obtain a remaining speech for the remaining segment from the external device performing the speech synthesis on the remaining segment through the communicator, and
output the speech by merging the first segments obtained in parallel and the remaining speech received from the external device through the speaker.

9. The electronic apparatus of claim 8, wherein the first segments correspond to a beginning part of the text input, and
wherein when executing the at least one instruction, the processor is further configured to output the speech by outputting the first segments and outputting the remaining speech received from the external device after outputting the first segments through the speaker.

10. A method of controlling an electronic apparatus, the method comprising:
based on a text input, obtaining prosody information of the text input;
segmenting the text input into a plurality of segments such that a processing time for converting the plurality of segments into speech segments in parallel in the electronic apparatus is less than a predetermined time;
obtaining speech segments in which the prosody information is reflected to each segment of the plurality of segments in parallel by inputting the plurality of segments and the prosody information to a text-to-speech (TTS) module; and
obtaining a speech for the text input by merging the speech segments,
wherein the method further comprises:
outputting an additional speech corresponding to the processing time for converting the plurality of segments into the speech segments and the speech for the text input after the additional speech.

11. The method of claim 10, wherein the segmenting comprises:
obtaining a plurality of first segments by segmenting the text input based on a first criterion, and based on a first processing time for converting the plurality of first segments to the speech segments being less than the predetermined time, inputting the plurality of first segments to the TTS module;
based on the first processing time for converting at least one first segment of the plurality of first segments to the speech segments being greater than or equal to the predetermined time, obtaining a plurality of second segments by segmenting the at least one first segment based on a second criterion, and
based on a second processing time for converting the plurality of second segments to the speech segments being less than the predetermined time, inputting the plurality of second segments to the TTS module.

12. The method of claim 11, wherein the first criterion comprises a punctuation marks criterion and the second criterion comprises a clause criterion, or the first criterion comprises the clause criterion and the second criterion comprises a phrase criterion.

13. The method of claim 10, wherein the prosody information comprises intonation information, and accent information of the text input based on at least one of a format, a syntactic structure, and a context of the text input.

14. The method of claim 10, wherein each segment of the plurality of segments comprises index information that is related to an order in the text input, and
wherein the obtaining the speech comprises obtaining the speech for the text input by merging the speech segments based on the index information.

15. The method of claim 11, wherein the outputting of the additional speech comprises identifying the additional speech from among a plurality of additional speeches based on a processing time to obtain the speech for the text input.

16. The method of claim 10, wherein the obtaining the speech segments comprises obtaining first segments of the plurality of segments in which the prosody information is reflected to each of the first segments in parallel by inputting the first segments and the prosody information to the text-to-speech (TTS) module, and
wherein the method further comprises:
transmitting, to an external device for speech synthesis, a remaining segment among the plurality of segments and the prosody information;
obtaining a remaining speech for the remaining segment from the external device performing the speech synthesis on the remaining segment; and
outputting the speech by merging the first segments obtained in parallel and the remaining speech received from the external device through a speaker.

17. The method of claim 16, wherein the first segments correspond to a beginning part of the text input, and
wherein the outputting comprises outputting the speech by outputting the first segments and outputting the remaining speech received from the external device after outputting the first segments through the speaker.

18. A non-transitory computer readable medium having stored thereon a program wherein when the program is executed, the program causes an electronic apparatus to perform a method of controlling the electronic apparatus, the method comprising:
based on a text input, obtaining prosody information of the text input;
segmenting the text input into a plurality of segments such that a processing time for converting the plurality of segments into speech segments in parallel in the electronic apparatus is less than a predetermined time;
obtaining speech segments in which the prosody information is reflected to each segment of the plurality of segments in parallel by inputting the plurality of segments and the prosody information to a text-to-speech (TTS) module; and
obtaining a speech for the text input by merging the speech segments, wherein the method further comprises:
outputting an additional speech corresponding to the processing time for converting the plurality of segments into the speech segments and the speech for the text input after the additional speech.

* * * * *